United States Patent
Pawar et al.

(10) Patent No.: US 9,542,396 B1
(45) Date of Patent: Jan. 10, 2017

(54) MANAGING A FILE SYSTEM TO AVOID UNNECESSARY REPLAY OF A TRANSACTION LOG

(71) Applicant: EMC Corporation, Hopkinton, MA (US)

(72) Inventors: Sitaram Pawar, Shrewsbury, MA (US); Jean-Pierre Bono, Westborough, MA (US); Yubing Wang, Holden, MA (US); Kumar V. K. H. Kanteti, South Grafton, MA (US); Pranit Sethi, Somerset, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 703 days.

(21) Appl. No.: 13/728,324

(22) Filed: Dec. 27, 2012

(51) Int. Cl.
*G06F 7/00* (2006.01)
*G06F 17/30* (2006.01)

(52) U.S. Cl.
CPC ..... *G06F 17/3007* (2013.01); *G06F 17/30368* (2013.01)

(58) Field of Classification Search
CPC ................................. G06F 17/30368
USPC ....................................... 707/648
See application file for complete search history.

(56) References Cited

U.S. PATENT DOCUMENTS

2009/0133025 A1* 5/2009 Malhotra et al. ............. 718/102
2011/0099212 A1* 4/2011 Hahn et al. ................... 707/822

OTHER PUBLICATIONS

EMC Corporation, StackOS Internals, Nov. 14, 2001, cover page and pp. 95-98, 113 and 114.
Description of the EMC Clariion IP4700 StackOS HTFS Epi-Daemon, Nov. 12, 2014, pp. 1-3.

* cited by examiner

*Primary Examiner* — Ajith Jacob
(74) *Attorney, Agent, or Firm* — Krishnendu Gupta; Daniel P. McLoughlin

(57) ABSTRACT

Managing a file system to avoid unnecessary replay of a transaction log. The file system may reside on a non-volatile storage medium having an associated transaction log residing on a non-volatile storage medium, the transaction log including a plurality of log entries, and each log entry representing one or more changes to metadata of the file system. The file system may include a first data structure including a status parameter, a value of which is indicative of whether to replay the transaction log when the file system is initialized. It may be determined whether the one or more changes to metadata represented by each of the plurality of log entries have been written in place in the file system. In response to the determination, the status parameter may be set to a value indicative of the determination.

20 Claims, 14 Drawing Sheets

MANAGING A FILE SYSTEM TO AVOID UNNECESSARY REPLAY OF A TRANSACTION LOG

BACKGROUND

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

File systems typically include metadata describing attributes of a file system and data from a user of the file system. A file system contains a range of file system blocks that store metadata and data. A user of a file system accesses the file system using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be as many as five levels of indirect blocks arranged in an hierarchy depending upon the size of a file where each level of indirect blocks includes pointers to indirect blocks at the next lower level.

The accuracy and consistency of a file system is necessary to relate applications and data used by those applications. In a data storage system, hundreds of files (or thousands or even more) may be created, modified, and deleted on a regular basis. Each time a file is modified, the data storage system performs a series of file system updates. These updates, when written to a disk storage reliably, yield a consistent file system. However, a file system can develop inconsistencies in several ways. Problems may result from an unclean shutdown, if a system is shut down improperly, or when a mounted file system is taken offline improperly. Inconsistencies can also result from defective hardware or hardware failures. Additionally, inconsistencies can also result from software errors or user errors.

Generally, data and metadata of a file of a file system read from a disk and written to a disk may be cached in a volatile memory such as a system cache of a data storage system. Caching of data and metadata of a file implies that read operations read data and metadata of the file from the volatile memory, rather than from a disk. Correspondingly, write operations may write data and metadata of a file to the volatile memory rather than to a disk. Data and metadata of a file cached in the volatile memory is written to the disk at intervals or in response to an event, as determined by an operating system of the data storage system, which often is referred to as "flushing" of a cache. Flushing of a cache may be triggered at a determinate time interval. Caching data and metadata of a file of a file system in a volatile memory improves performance of the file system as accessing data from a disk involves an I/O operation to a disk which is slower than accessing data from the volatile memory.

The frequency at which a cache is flushed in a data storage system affects performance and reliability of the data storage system. If the data storage system flushes the cache too often, performance of the data storage system degrades significantly as a large number of disk I/Os are performed to write data to a disk. If the data storage system does not flush the cache often enough, a volatile memory of the data storage system may be depleted by the cache, or a sudden system failure (such as a loss of power) may cause the data storage system to lose data stored in the cache.

Metadata changes of a file system resulting from an I/O request may be directly written to the file system stored on a disk, or logged in a transaction log. As used herein, "logging" a transaction means to record a transaction entry in a transaction log in non-volatile storage. A transaction log may be used to improve performance, reliability, and recovery times of file systems. A transaction log may provide increased reliability, because the transaction log may describe some or all changes to file metadata, which can be applied to the file system at a later time in order to make the file system metadata consistent with changes applied to data of the file system. However, frequent and recurring updates to a file system may fill up a transaction log.

Typically, a transaction log only stores changes to metadata objects (such as inodes, directories, allocation maps) of a file system. If the file system (e.g., the storage system including the file system) is shut down without a failure (e.g., intentionally, at a scheduled time), the transaction log can be discarded because the file system stored on a persistent storage in such a case should be consistent and include all metadata changes stored in the transaction log. However, when a file system shuts down due to a failure, the transaction log may be used to rebuild the file system in order to restore the file system to a consistent state. Generally, for all write operations resulting in changes to metadata of a file system, before writing the change in place in the file system, a log entry describing the transaction is stored in the transaction log. As used herein, a change to metadata has been made or recorded "in-place" when it has been made to the actual data structures of the non-volatile data storage block of the file system in which the metadata resides (or will reside in the event of creation of new metadata), as opposed to being recorded or reflected in another location in volatile or non-volatile memory, e.g., in a memory buffer or a transaction log.

The corresponding metadata structures of the file system (within persistent storage) may be updated in place at a later time when the corresponding metadata changes stored in cache are written (e.g., flushed) to the persistent storage. Thus, metadata structures stored on the persistent storage may contain stale data that is not consistent with the metadata changes described in the transaction log. Accordingly, when a file system is initialized, the metadata changes described in the transaction log may be applied to the metadata structures stored on the persistent disk to recover the file system to a consistent state. The process of recovering the file system to a consistent state by applying metadata changes stored in the transaction log to the persistent storage is known as "replaying" the transaction log.

SUMMARY

This Summary provides an illustrative context for aspects of the invention, in a simplified form. It is not intended to be used to determine the scope of the claimed subject matter. Aspects of the invention are described more fully below in the Detailed Description.

In some embodiments of the invention, a file system may be managed to avoid unnecessary replay of a transaction log. The file system resides on a non-volatile storage medium having an associated transaction log residing on a non-volatile storage medium, the transaction log including a plurality of log entries, and each log entry representing one or more changes to metadata of the file system. The file system includes a first data structure including a status parameter, a value of which is indicative of whether to replay the transaction log when the file system is initialized. It is determined whether the one or more changes to metadata represented by each of the plurality of log entries have been written in place in the file system. In response to the determination, the status parameter is set to a value indicative of the determination.

In some aspects of these embodiments, it is determined that the one or more changes to metadata represented by each of the plurality of log entries have been written in place in the file system, and the status parameter is set to a first value indicating to not replay the transaction log when the file system is initialized. During an initializing of the file system, replaying any portion of the metadata transaction log is refrained from based on the first value.

In other aspects, a first of the plurality of log entries is logged in the transaction log. Based at least in part on the logging, it is determined that the one or more changes to metadata represented by each of the plurality of log entries have not been written in place in the file system, and the status parameter is set to a second value indicating to replay the transaction log when the file system is initialized.

In other aspects, the transaction log includes a plurality of sectors, and a log use map including a plurality of map entries is provided. The log use map indicates whether the transaction log includes one or more log entries for which the corresponding one or more metadata changes have not been written in place in the file system. The act of determining includes accessing the log use map.

In other aspects, the log use map includes a plurality of map entries, each map entry corresponding to a respective one of the sectors, and each map entry having a value indicative of whether the respective sector has at least a portion of a log entry stored thereon for which the one or more metadata changes represented by the log entry have been written in place in the file system.

In yet other aspects, one or more metadata changes corresponding to the first log entry are written in place in the file system. Based at least in part on the writing, it may be determined that the one or more changes to metadata represented by each of the plurality of log entries have been written in place in the file system. The status parameter is set to a first value indicating to not replay the transaction log if the file system is initialized. Based at least in part on the writing, the first map entry is set to the first value.

In some embodiments of the invention, a system is configured with logic to perform one or more of the foregoing acts.

In some embodiments of the invention, one or more of the foregoing acts may be defined by computer-readable signals tangibly embodied on one or more computer-readable media, for example, non-volatile recording media, integrated circuit memory elements, or a combination thereof.

Other advantages, novel features, and objects of the invention, and aspects and embodiments thereof, will become apparent from the following detailed description of the invention, including aspects and embodiments thereof, when considered in conjunction with the accompanying drawings, which are schematic and are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
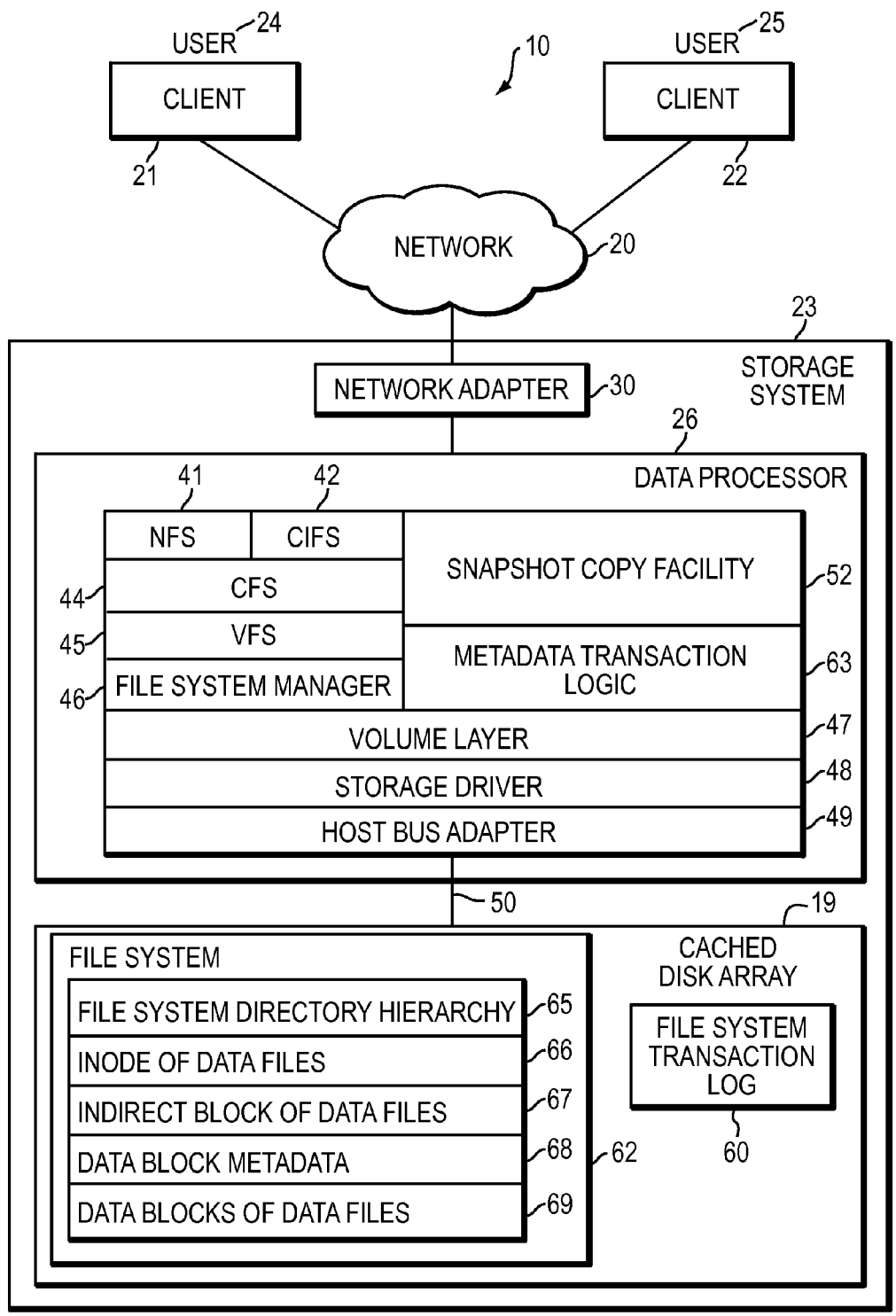
FIGS. 1-2B are block diagrams, each illustrating an example of an embodiment of a system that may utilize the techniques described herein, according to some embodiments of the invention.

A storage system may include tens, hundreds or even thousands of file systems. Replaying the transaction logs of all these file systems during re-initialization after a failure of the storage system can be relatively time consuming, during which time the storage system or one or more file systems therein is "down" and unusable by clients.

Described below are systems and methods for managing a file system to avoid unnecessary replay of a transaction log. A file system may be configured so that its transaction log will not be replayed if the file system had been clean at the time at which the file system failed. Such a file system may be part of a storage system such as, for example, a file-based storage system. The file system may include a status parameter, a value of which indicates whether the file system is clean or dirty, and which may be used to determine whether to replay the transaction log during file system initialization, for example, during a system recovery after a failure. During the processing of file system transactions, the value of the file system status parameter may be set to a value indicating that the file system is clean, and thus consistent with the transaction log. The status parameter may be set to this value when it is determined that, for each entry in the transaction log, all corresponding metadata changes have been made in place in the file system.

In some embodiments of the invention, the transaction log is divided into a plurality of sectors, and a log use map is employed that indicates which of the sectors are active. A sector may be deemed active if it holds a log entry for which the corresponding metadata changes have not yet been written in place in the file system. The log use map may include an entry (e.g., a bit) for each sector in the transaction log. The value of an entry corresponding to a transaction log sector may be set to a value indicating "active" when a log entry is created that consumes the sector; and the same entry may be changed (i.e., cleared) to indicate that the sector is free when all corresponding metadata changes have been written in place in the file system. Determining whether the file system is clean, and then setting status parameter accordingly, may involve accessing the log use map to determine whether each sector in the log use map has been cleared.

By setting a file system parameter to indicate when a file system is clean as described herein, the recovery time of the file system following a system failure may be reduced, which may be especially valuable for critical applications utilizing the file system.

The function and advantage of embodiments of the present invention described above and other embodiments will be more fully understood from the examples described below. The following examples are intended to facilitate a better understanding and illustrate the benefits of the present invention, but do not exemplify the full scope of the invention.

As used herein, whether in the written description or the claims, the terms "comprising," "including," "carrying," "having," "containing," "involving," and the like are to be understood to be open-ended, i.e., to mean including but not limited to. As used herein, "plurality" means two or more.

EXAMPLES

FIG. 1 is a block diagram illustrating an example of a system 10 that may be used in connection with performing techniques described herein. System 10 is merely an illustrative embodiment of such a system, and is not intended to limit the scope of the invention. Any of numerous other implementations of such a system, for example, variations of system 10, are possible and are intended to fall within the scope of the invention.

System 10 may include a network 20 interconnecting clients 21, 22 to one or more other system elements such as, for example, a storage system 23, which in the illustrative example of FIG. 1 is a file-based storage system (e.g., a file server), as will be described in more detail below. Clients 21, 22 may be, for example, workstations such as personal computers, and may be operated by respective users 24, 25. For example, user 25 may be a system administrator having sufficient privileges for configuring storage system 23 and for receiving status and error messages from it. Each of clients 21, 22 may perform different types of data operations in accordance with different types of tasks. In the embodiment of FIG. 1, any one of clients 21, 22 may issue a data request to storage system 23 to perform a data operation. For example, an application executing on one of clients 21, 22 may perform a read or write operation resulting in one or more data requests to storage system 23. Clients 21, 22 may access storage system 23, for example, in performing input/output (I/O) operations, data requests, and other operations.

Network 20 may include one or more segments of transmission media over which communications may be exchanged between clients 21 and 22 and storage system 23, and other components (not shown) of system 10. Each segment may be any of a plurality of types of transmission media, including: one or more electrical or optical wires or cables made of metal and/or optical fiber, air (e.g., using wireless transmission over carrier waves) or any suitable combination of these transmission media. Network 20 may include one or more other network elements not shown in FIG. 1, including, but not limited to a Connectrix, a repeater, a switch, a hub, a multiplexer, other switching elements, a satellite, other known or later developed network elements, or any suitable combination of any of the foregoing. Network 20 may be or include any a variety of types of networks that enable communication between components such as, for example, the Internet, an intranet, a data network, an optical network, a computer network, a communication network, a telephony network, a wireless network, a Local Area Network (LAN), a Metropolitan Area Network (MAN), a Wide Area Network (WAN), or any suitable combination of the foregoing, and may employ any of a variety of known or later developed communication technologies and/or protocols such as, for example, Ethernet, TCP/IP, UDP and related technologies and protocols, to name just a few. It should be appreciated that network 20 may be as simple as a single wire, bus, wireless connection, or other type of segment interconnecting two or more components. Further, it should be appreciated that network 20 may be considered to include one or more of the components that it connects, or sub-components thereof, for example, one or more sub-components of clients 21 or 22 or storage system 23.

In some embodiments, storage system 23 may include various components or aspects of, or be implemented as described in, Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

Storage system 23 may be a network-based storage system, and may include at least one: data processor 26 and cached disk array 19. Cached disk array 19 may include any of: multiple disk drives, a high-speed random-access cache memory, and a logical-to-physical mapping between the cache memory and the disk drives. Data processor 26 may be, for example, a commodity computer. In some embodiments of the invention, data processor 26 may be, may include, or may be included as part of, a data mover of a storage system.

Data processor 26 may have a network interface 30 for communication of data packets over network 20 via a data transmission protocol such as TCP/IP. Data processor 26 may be programmed with a Network File System (NFS) module 41 for supporting communication with network clients over network 20 using the NFS file access protocol, and a Common Internet File System (CIFS) module 42 for supporting communication with network clients over network 20 using the CIFS file access protocol. NFS module 41, and CIFS module 42 may be layered over a Common File System (CFS) module 44, and the CFS module may be layered over a Virtual File System (VFS) module 45. VFS module 45 may be layered over a Universal File System (UxFS) module. The UxFS module may be a file system manager 46 for managing a file system such as a UNIX-based file system. CFS module 44 provides higher-level functions common to NFS 41 and CIFS 42.

File system manager 46 may be configured to access data organized into logical volumes defined by a logical volume layer module 47. Each logical volume maps to contiguous logical storage addresses in cached disk array 19. Logical volume layer module 47 may be layered over a storage driver 48 such as a Fibre-Channel (FC), a Small Computer System Interface (SCSI), and an Internet SCSI (iSCSI) driver. Data processor 26 may be configured to send storage access requests through a host bus adapter 49 using a storage protocol such as the FC, SCSI, or iSCSI used by storage driver 48, depending on physical data link 50 between data processor 26 and cached disk array 19.

CFS module 44, VFS module 45, file system manager 46, logical volume layer 47, and storage driver 48 may be modules of an operating system program executing on storage system 23. NFS module 41 and CIFS module 42 may be internal application programs supported by the operating system. Data processor 26 may be programmed with additional internal application programs including a snapshot copy facility 52.

Snapshot copy facility 52 may be configured to perform a copy-on-first-write to each block in a production volume, in order to save an old version ("before image") of the changed block in a snapshot volume. Details regarding such a snapshot copy facility 52 are found in the following patent publications: Armangau et al., "Instantaneous restoration of a production copy from a snapshot copy in a data storage system," U.S. Pat. No. 6,957,362 issued Oct. 18, 2005; Raman et al., "Replication of Remote Copy Data for Internet Protocol (IP) Transmission," U.S. Patent Application Publication No. US 2003/0217119 A1, published Nov. 20, 2003; Armangau et al., Replication of a Snapshot Using a File System Copy Differential," U.S. Patent Application Publication No. US 2004/0267836 published Dec. 30, 2004; Armangau et al., Data Recovery with Internet Protocol Replication With or Without Full Resync," U.S. Patent Application Publication No. US 2005/0015663 A1, published Jan. 20, 2005; and John Hayden et al., "Internet Protocol Based Disaster Recovery of a Server," U.S. Published Patent Application No. 2005-0193245 published Sep. 1, 2005; all of which are incorporated herein by reference.

The processors included in clients 21, 22 and data processor 26 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in storage system 23 are described herein in more detail, and may vary with each particular embodiment. Each of clients 21, 22 and storage system 23 may all be located at the same physical site, or, alternatively, may also be located in different physical locations. Further, one or more elements of storage system 23 may reside within the same physical machine or device or may be distributed across one or more physically separate machines or devices connected by one or more network segments (e.g., one or more of the types of physical links described above in relation to network 20 or physical link 50).

An embodiment of system 10 may include one or more network file servers. For example, storage system 23 may be, may be included as part of, or may include, a file-based storage system such as, for example, a file server. Each of the network file servers may include one or more data storage devices, such as disks. One or more of the network file servers included in system 10 may be inter-connected (not shown) to each other and one or more clients, for example, by one or more segments of transmission media, technologies and protocols such as, for example, any of those described above in relation to network 20 and physical link 50. The type of transmission media, technologies and protocols used may vary with certain system parameters and requirements, such as those related to bandwidth and throughput required in accordance with a rate of I/O requests that may be made by clients, for example, to storage system 23.

It should be noted that each of the network file server may operate stand-alone, or may also be included as part of a storage area network (SAN) that may include, for example, other components such as other network file servers.

Each of the network file servers of element 10 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Clients, such as 21, 22, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system may be created from a logical device or logical volume. The logical volume may or may not correspond to an actual disk drive. For example, one or more logical volumes may reside on a single physical disk drive. Data in a single storage system may be accessed by multiple clients allowing the clients to share the data residing therein. A LUN (logical unit number) may be used to refer to one of the foregoing logically defined devices or volumes.

In such an embodiment in which system 10 of FIG. 1 is implemented using one or more data storage systems, each of the data storage systems may include code thereon for performing the techniques as described herein. In following paragraphs, reference may be made to a particular embodiment such as, for example, an embodiment in which system 10 of FIG. 1 may include any of: a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, storage system 23 may also include other components than as described for purposes of illustrating the techniques herein.

As shown in the system 10 in FIG. 1, a file system 62 may be organized as a hierarchy. At the top of the hierarchy may be a hierarchy of directories 65 in the file system 62. Inodes of data files 66 may depend from the file system directory hierarchy 65, and indirect blocks of data files 67 depend from the inodes of data files 66. Data block metadata 68 and data blocks of data files 69 depend from the inodes of data files 66 and from the indirect blocks of data files 67. Some embodiments of this hierarchy are further described below with reference to FIG. 3. File system 62 may contain a range of file system blocks that store metadata and data. In at least some embodiments of the invention, a file system block may be 8 kilobytes (KB) in size.

System 10 also may include a file system transaction log 60. In at least one embodiment of the invention, a transaction log may include a persistent log or a persistent file that may be used to update metadata of a file system stored on a persistent storage. In some embodiments of the invention, before making any change to metadata of file system 62 in place within the file system 62, a transaction record (i.e., "log entry" or "transaction entry") describing the change may be written to transaction log 60.

Log entries stored in the transaction log 60 may be later used to recover the file system 62 when storage system 23 reboots due to a failure. Upon reboot of storage system 23, file system transaction log 60 may be inspected to find valid log entries recorded therein, which then may be applied to the file system 62 to update metadata of the file system. In at least one embodiment of the invention, metadata transaction logic 63 may be configured to store changes to metadata of a file system in a volatile memory of storage system 23 upon receiving write I/O requests directed to the file system, and to periodically update metadata of the file of the file system stored on a persistent storage at a specific time interval or in response to a specific event or determination.

In some embodiments of the invention, file system transaction log 60 may be logically integrated as part of file system 62 itself, and in other embodiments may be a logical component of storage system 23 that is external to the file system 62, e.g., as part of a same or separate logical volume, and/or may be on a same or separate disk.

Figure 2A:
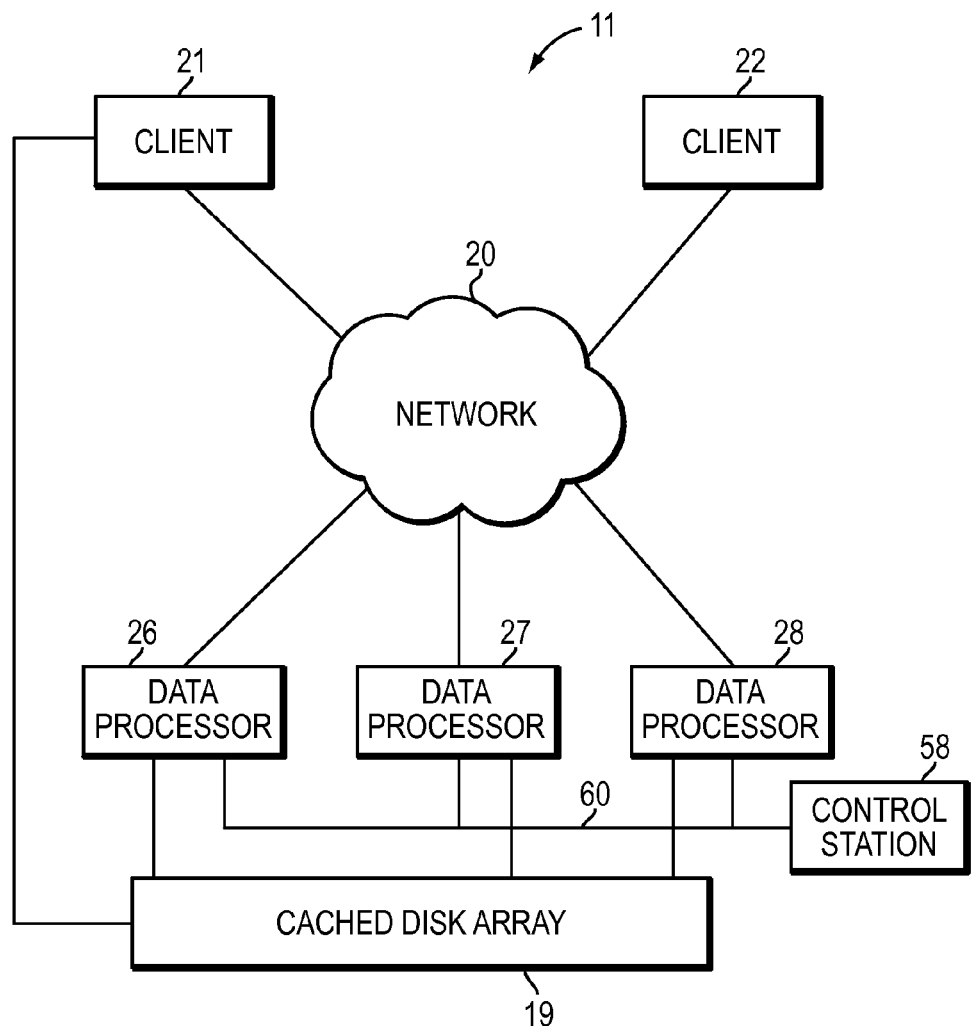

FIG. 2A is a block diagram illustrating an embodiment of a system 11, which may be an embodiment of system 10, and which may be used in connection with performing the technique or techniques described herein. System 11 is merely an illustrative embodiment of such a system, and is not intended to limit the scope of the invention. Any of numerous other implementations of such a system, for example, variations of system 11, are possible and are intended to fall within the scope of the invention.

As illustrated in FIG. 2A, in system 11, storage system 23 may further include a control station 58 and additional data processors (such as data processors 27 and 28) sharing a cached disk array 19. A dual-redundant data link 60 may be configured to interconnect data processors 26, 27, 28 to control station 58. Control station 58 may be configured to monitor a heartbeat signal from each of data processors 26, 27, 28 in order to detect a data processor failure. If a failed data processor cannot be successfully re-booted, control station 58 may be configured to "fence off" the failed data processor and re-assign or fail-over the data processing responsibilities of the failed data processor to another data processor in storage system 23. Control station 58 also may be configured to provide a user interface between system administrator 25 and storage system 23.

Figure 2B:
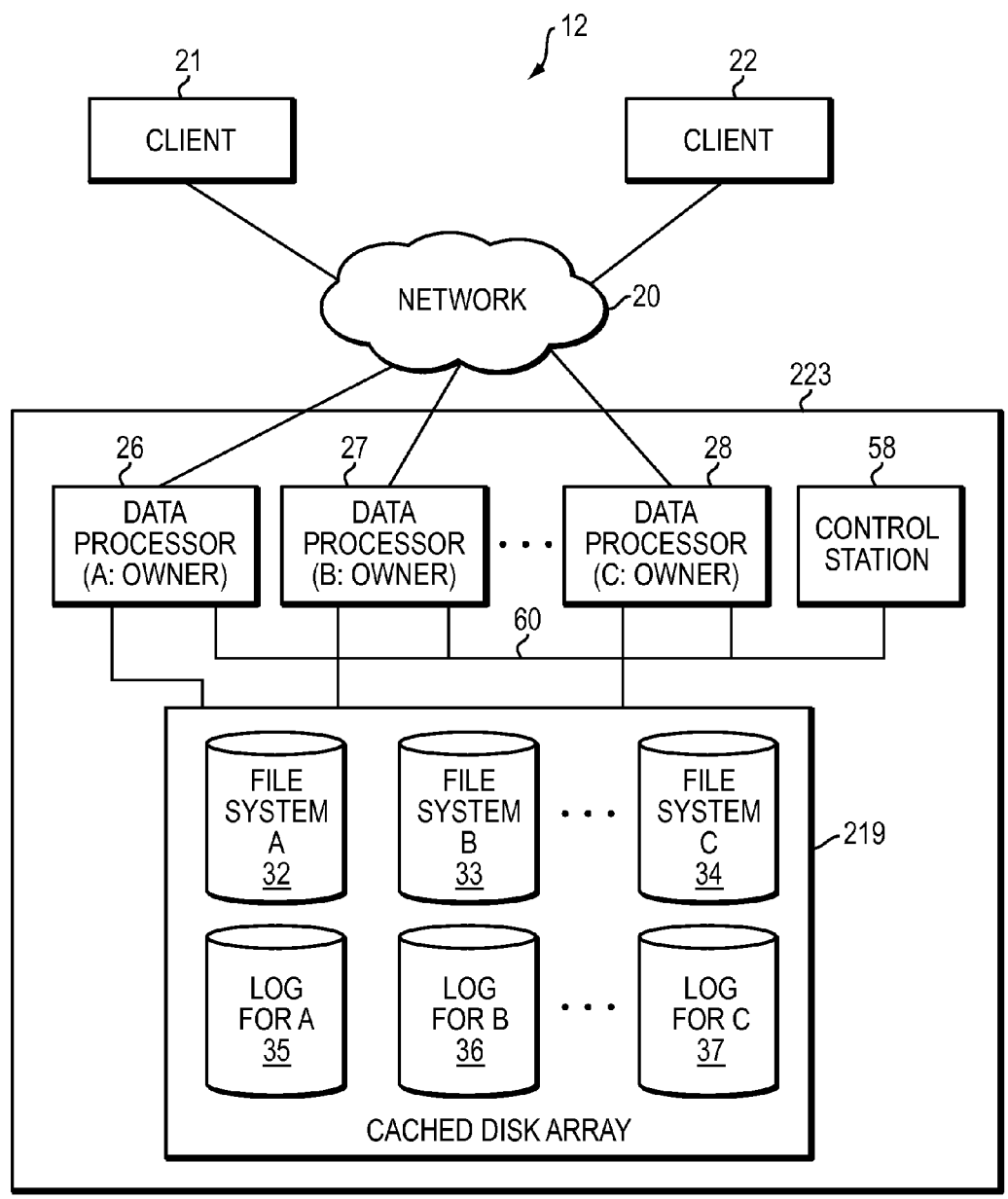

FIG. 2B is a block diagram illustrating an embodiment of a system 12, which may be an embodiment of system 10 or 11, which may be used in connection with performing the technique or techniques described herein. System 12 is merely an illustrative embodiment of such a system, and is not intended to limit the scope of the invention. Any of numerous other implementations of such a system, for example, variations of system 12, are possible and are intended to fall within the scope of the invention.

As illustrated in FIG. 2B, in system 12, storage system 223 (e.g., an embodiment of storage system 23) may further include a plurality of file systems 32-34 and respective transaction logs 35-37, which may be configured such that clients 21 and 22 may access the same file stored in a persistent storage device of cached disk array 219 (e.g., an embodiment of cached disk array 19) from any of data processors 26, 27, 28. To ensure data consistency in such a case, a respective one of the data processors may be designated as the exclusive owner of each file system for the purpose of granting read-write access to the file system. For example, files stored in a persistent storage device of cached disk array 219 may be organized into disjoint file systems such as file system 32 named "A" and owned by data processor 26, file system 33 named "B" and owned by data processor 27, and file system 34 named "C" and owned by data processor 28. For recovery purposes, each file system may have an associated file system transaction log (also referred to simply as a "log") stored on a persistent storage device of cached disk array 219. Thus, the file system named "A" may have a log 35, the file system named "B" may have a log 36, and the file system named "C" may have a log 37. One or more of transaction logs 35-37 may be logically integrated as part of its respective file system 32-34, and one or more of transaction logs 35-37 may be a logically separate component of storage system 23, external to its respective file system 32-34.

Figure 3:
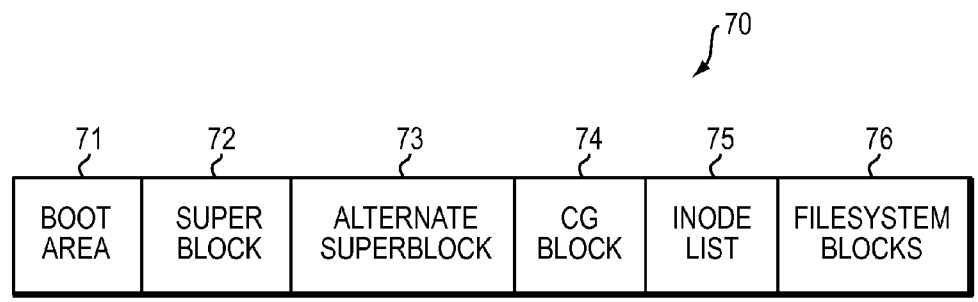
FIG. 3 illustrates an example of a data structure of a file system on disk, according to some embodiments of the invention.

FIG. 3 illustrates an example of a data structure of a file system 70 on disk (e.g., any of file systems 62, 32-34, 624 and 724 described in relation to FIGS. 1, 2B, 6 and 7), which may be used in connection with performing one or more aspects of the invention described herein. This data structure is merely an illustrative embodiment of data structure of a file system, and is not intended to limit the scope of the invention. Any of numerous other implementations of data structure of a file system, for example, variations of the data structure illustrated in FIG. 3, are possible and are intended to fall within the scope of the invention. File system 70 may be an embodiment of file system 62 described above. As used herein, "on disk" means stored on a non-volatile storage medium (typically on one or more disks), as opposed to on a volatile storage medium, and "in memory" means stored on a volatile storage medium, as opposed to on a non-volatile storage medium.

A file system 70 may include any of: a boot area 71, a superblock 72, an alternate superblock 73, Cylinder Group Block (CG) block 74, an inode list 75, and file system blocks 76. Boot area 71 may contain code for booting an operating system of storage system 23. Superblock 72 and alternate super block 73 contains attributes and metadata of the file system. Cylinder Group Block 74 contains metadata information pertaining to cylinder groups of the file system. Inode list 75 may include the list of all inodes of each file that is present in the file system.

A file system 70 may include one or more file system blocks 76. Some of the file system blocks may be data blocks, some file system blocks may be indirect block, as described above, or some file system blocks may be free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There may be one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. In a typical file system, there may be at least fifteen block pointer entries in a block pointer array contained in an inode of a file.

In some embodiments of the invention, as is described in more detail below in relation to system 700 of FIG. 7, and methods 800, 1100 and 1200 of FIGS. 8, 11 and 12, respectively, a file system may include a status parameter indicating whether the file system is "clean" or "dirty," which may be used to determine whether it is necessary to replay the transaction log.

Conventionally, in-place updates are often eliminated or batched together because updates to metadata structures on the persistent storage are delayed when the transaction log is used to record changes to metadata. For example, an inode may be modified several times in cache memory before it is flushed to disk. Further, multiple inodes stored in the same block may be modified between flushes. Accordingly metadata changes to multiple inodes stored in the same disk block may be written together as part of a single flush to disk.

Each write request of a client may result in changes to multiple metadata objects. For example, a request for a file system operation such as "create file" includes changes to metadata of a directory under which a file is created, and changes to inodes of the file and the directory. As used herein, a "write request" is a data request received from a client for a file system that results in a I/O write operation to disk, such as, for example (e.g., in a Unix system): "setattr", "write", "link", "symlink", "create", "remove", "mkdir", "rmdir", and "rename." In conventional systems, this plurality of metadata changes may be combined within a single metadata transaction entry that described the changes. Further, rather than perform a separate disk I/O write operation to the transaction log for each transaction entry, the writing of transaction entries to the transaction log may be batched together in one disk I/O write, for example, using staging buffers as described below. For example, temporally close transaction may be so batched, e.g., in an order in which the corresponding write requests were received by the storage system. Combining multiple transactions into a single log write operation (i.e., a "log write") reduces the total number of disk writes for metadata blocks. As used herein, a "log write" is an I/O write operation to a transaction log.

Figure 4:
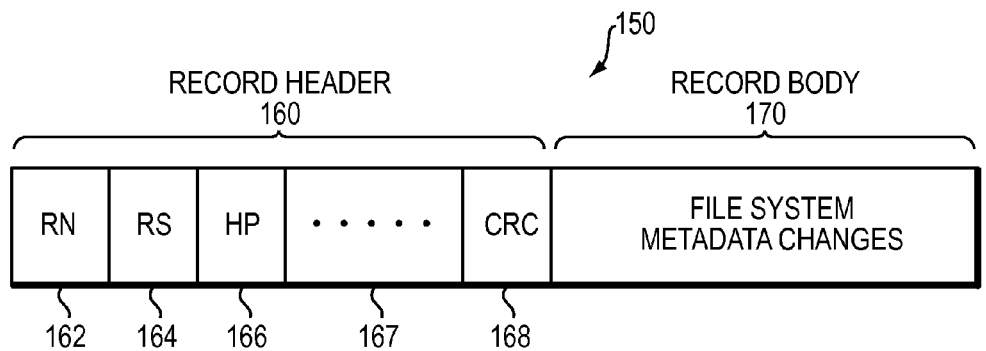
FIG. 4 illustrates an example of a data structure of a log entry of a transaction log, according to some embodiments of the invention.

FIG. 4 illustrates an example of a data structure of a log entry (which also may be referred to as a "transaction record" or "transaction entry") 150 of a transaction log (e.g., 60, 626, 726), which may be used in connection with performing one or more aspects of the invention described herein. This data structure is merely an illustrative embodiment of data structure of a log entry, and is not intended to limit the scope of the invention. Any of numerous other implementations of a data structure of a log entry, for example, variations of the data structure illustrated in FIG. 4, are possible and are intended to fall within the scope of the invention.

A transaction log may include a plurality of log entries, in which each log entry includes changes to metadata associated with a write request (e.g. a NFS request) sent by a client connected to storage system 23. A log entry 150 may include a record header 160 and a record body 170. Record body 170 may contain changes to metadata of a file system resulting from a write request/transaction. Record header 160 may include a record number (RN) 162, a record size (RS) 164, a head pointer (HP) 166, and a number of additional fields 167, for example, as described below in relation to log entry information 738 of system 700. The last field of the header may be a cyclic redundancy check (CRC) field 168, which may be, for example, a thirty-two-bit CRC known as "CRC32" computed by calling an operating system utility routine.

RN 162 may include a record or transaction number of the transaction entry. The transaction number assigned to entries may be a monotonically increasingly number, and may be assigned to entries in chronological order in which the write requests corresponding to the transaction entry are received by the file system. For example, a first transaction entry corresponding a first received write request may be assigned a value "1," a second transaction entry corresponding a second received write request may be assigned a value "2," and a tenth transaction entry corresponding a tenth received write request may be a value "10," etc. In some embodiments, the transaction number of an entry (RN) modulo the number of sectors (SN) in the transaction defines the position (P) of the entry within the log; i.e., the sector in which the entry begins; that is: RN modulo SN=P. In such embodiments, if a first transaction entry consumes more than one (X) sectors, then the transaction number (T2) assigned the next entry is set to be the transaction number (T1) of the first entry plus X. Thus, if T1=555 and consumes two sectors, then T2=555+2=557.

RS 164 reflects the size of the entry, and may be used to determine the amount of log sectors that will be needed to reserve the log sectors in the transaction log and/or in staging buffers in cache memory (described in more detail below).

HP field 166 may be a pointer to (e.g., the transaction number of) the transaction entry that is at the head of the transaction log. The head of the log may represent the first (i.e., earliest) transaction entry that is "active"—meaning that not all of the metadata changes (e.g., changes to inodes) described by the entry have been written in place in the file system yet, e.g., as part of a cache buffer flush. That is, at least one committed metadata block associated with the entry is dirty. The transaction log head is the log entry from which log replay should be begin during a file system initialization (e.g., after a system failure). Each time a transaction entry is created (e.g., act 904 described below in relation to method 900), a value indicative of the header entry (e.g., the transaction number) may be written in HP field 166, for example, by metadata transaction logic 722, which may use log use map 728 to determine the head. In embodiments in which the transaction number of an entry (RN) is assigned such that RN modulo the number of sectors (SN) in the transaction log defines the position (P) of the entry within the log; i.e., the sector in which the entry begins, the position, P(head), of the head within the transaction log may be determined by P(head)=RN(head) modulo SN, where RN(head) is the transaction number of the head specified in the tail entry. As is described in more detail below in relation to method 1200 of FIG. 12, after determining the log entry that is the tail of the transaction log, the head may be determined by accessing HP field 166 of the tail entry.

Figure 5:
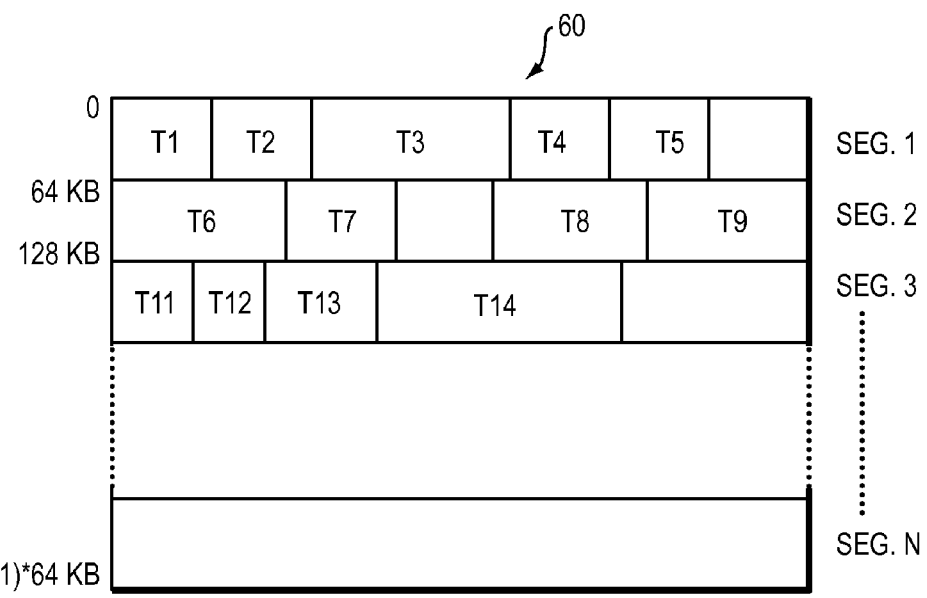
FIG. 5 illustrates an example of a data structure of a transaction log, according to some embodiments of the invention.

FIG. 5 illustrates an example of a data structure of a transaction log 60 (e.g., 626, 726), which may be used in connection with performing one or more aspects of the invention described herein. This data structure is merely an illustrative embodiment of a data structure of a transaction log, and is not intended to limit the scope of the invention. Any of numerous other implementations of data structure of a log entry, for example, variations of the data structure illustrated in FIG. 5, are possible and are intended to fall within the scope of the invention.

Transaction log 60 may be organized as a sequence of segments of a predefined size, for example, 64 kilobytes (KBs), and in some embodiments may have a predefined overall size, for example 64 megabytes (MB). A series of transaction entries T1 to T14 are shown in transaction log 60. As will be described in more detail below in relation to systems 700 and 1000, and method 900, prior to being written to transaction log 60, transaction entries may be batched within buffers in memory (e.g., staging buffers 740 or 1040), and written to the transaction log 10 in a single write operation or concurrent write operations. As used herein, the performance of two actions may be described as "concurrent" if at least a portion the performance one of the actions temporally overlaps with performance of at least a portion of the other action. The cumulative size of the entries included in the one or more write operations may be configured to be no greater than the predefined segment size (e.g., 64 KB) of the transaction log, and these write operation may be controlled so that no single or concurrent write operations cross segment boundaries.

Further, each segment of transaction log 60 may divided into a plurality of sectors of predefined size, e.g., 512 bytes. Each transaction entry may consume one or more sectors up to a maximum number of sectors remaining in a current segment. In some embodiments, transaction entries may be controlled to not span multiple segments—i.e., to not cross segment boundaries. Each sector may include contents of only a single transaction entry at any given time, albeit an entry may span multiple sectors. In an embodiment, all entries are configured to have a size that is a multiple (e.g., 1×, 2×, 3×) of the sector size (e.g., 512, bytes). However, the amount of bytes needed to describe a given transaction may not necessarily be a multiple of the sector size—i.e., does not align with sector boundaries. In such a case, the remaining bits of the last 512-byte portion of the transaction entry may be padded (e.g., with all "0"s).

Transaction buffer 60 may be a circular data structure in that, after a last segment is populated with log entries, populating log entries then may start over at the beginning of the data structure—i.e., the first segment, starting with the first sector therein. Circling the transaction log in this manner potentially involves overwriting previously written stale log entries. It should be appreciated that, in embodiments in which write operations cannot cross segment boundaries, there may be some sectors in a segment that are not written. However, the first sector of a segment, beginning at the first byte of the sector, may be guaranteed to have a log entry written therein. Guaranteeing an entry in a first sector may be useful in determining a head and a tail of an active log during playback, as described below in relation to method 1200 of FIG. 12. As used herein, an "active log" or "active transaction log" is a transaction log that has one or more active sectors.

Initiating a file system (e.g., 62, 624, cache buffer) may include replaying transaction log 60 from a log entry that is a head of the transaction log 60 to log entry that is a tail of the transaction log; i.e., re-executing in turn each metadata transaction described in each log entry.

In some embodiments of the invention, as will now be described, there are three basic steps of processing a write request from a client and persisting it to the file system: modifying metadata in memory (i.e., a cache buffer); recording a transaction reflecting the metadata modification in a transaction log; and writing the modified metadata in place in the file system on disk. In some embodiments of the invention, the storage of metadata changes resulting from a write request is deemed sufficiently stable after recording a transaction in a transaction log such that an acknowledgement may be sent to the client that the write request is complete. The metadata changes may be deemed sufficiently stable because, even if the system crashes before the metadata changes are written in place in the file system, the transaction log can be replayed during crash recovery, resulting in the metadata changes being written in place in the file system.

Figure 6:
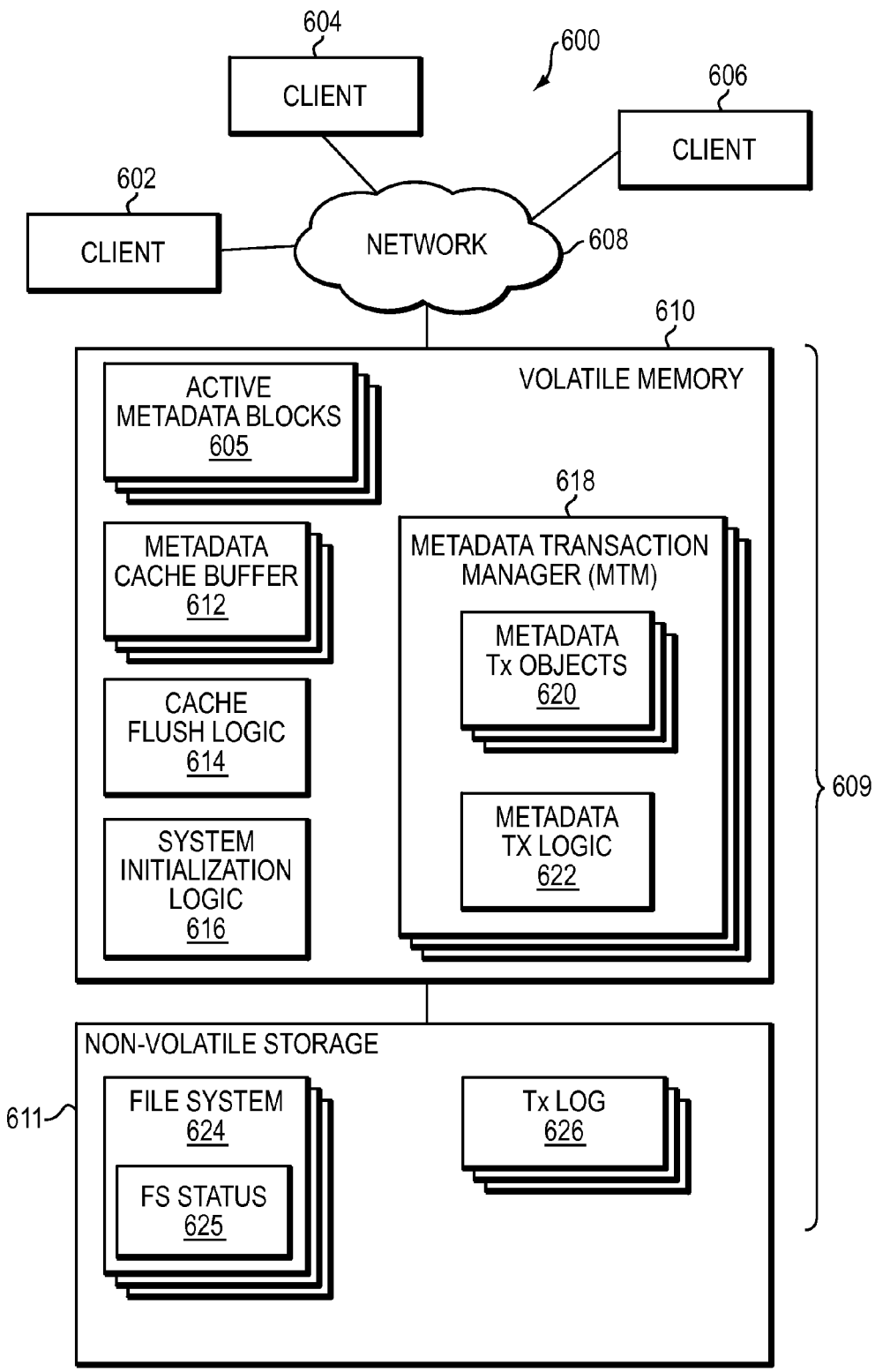
FIG. 6 is a block diagram illustrating an example of system for managing the recording of metadata changes to, and/or the initialization of, a file system, according to some embodiments of the invention.

FIG. 6 is a block diagram illustrating an example of system 600 for managing the recording of metadata changes to, and/or the initialization of, a file system, which may be used in connection with performing one or more aspects of the invention described herein. System 600 is merely an illustrative embodiment of a system for managing the recording of metadata changes to, and/or the initialization of, a file system, and is not intended to limit the scope of the invention. Any of numerous other implementations of such a system, for example, variations of system 600, are possible and are intended to fall within the scope of the invention. System 600 may be an embodiment of system 10, 11 or 12 described above, and may be implemented as described below in relation to system 700 of FIG. 7.

System 600 may include clients 602-606, network 608 and one or more storage systems 609, which may be a file-based storage system (e.g., a network file server). Each of clients 602-606 may be an embodiment of a client 21 or 22 described above in relation to FIG. 1; network 608 may be an embodiment of the network 20; and storage system 609 may be an embodiment of storage system 23 and/or 223. Storage system 609 may include volatile memory 610 and non-volatile storage 611. Non-volatile storage 611 is a non-volatile storage medium (e.g., an array of disks) that may be used for persistent storage—i.e., to store information that will remain stored when the storage system is powered off and thus can be accessed when system power is restored or turned-on. Non-volatile storage 611 may include one or more file systems 624 (each of which may be an embodiment of file system 32, 33, 34, 62 and/or 70) and one or more transaction logs 626 (each of which may be an embodiment of transaction log 60, 35, 36 or 37). Each of file systems 624 may include a file system status parameter 625 indicating whether the file system is clean or dirty. As described below in relation to method 1200, file system status parameter 625 may be used to determine whether replaying the transaction log of the file system is necessary.

Volatile memory 610 is a volatile storage medium (e.g., semiconductor memory) that may be used for temporary (i.e., non-persistent) storage while storage system 609 is "on" (i.e., while power is being supplied to storage system 609). A benefit of volatile memory 610 is that that access (e.g. read and write) to information stored thereon is typically faster than access to information on non-volatile storage 610. A downside to volatile memory 610 is that any information stored thereon is lost when storage system power is down. Volatile memory 610 may include any of: one or more active metadata blocks 605; one or more metadata cache buffers 612; cache flush logic 614; system initialization logic 616; and one or more metadata transaction managers (MTMs), which may include one or more metadata objects 620 and metadata transaction logic 622.

One or more elements described in relation to FIG. 6 as being part of volatile memory 610 may be implemented as part of a data processor (e.g., 26, 27 or 28), and one or more elements may be implemented as part of a cache disk array (e.g., 19 or 219). As a non-limiting example, cache flush logic 614, system initialization logic 616 and MTM 618 may reside (at least at one point in time) in a data processor, and metadata cache buffer 612, cache flush logic 614, and system initialization logic may reside (at least at one point in time) within a cached disk array. As used herein, a "metadata cache buffer" is one or more units of memory cache used for metadata. Each of cache buffers 612 (or 712 described below) may be part of a system cache of storage system 609 (or 709 described below).

Write requests may be received from any clients of storage system 609, e.g., any of 602-606. MTM 618 may be configured to control, for each write request received: updating the appropriate active metadata blocks 605 in accordance with the write request; logging a transaction in transaction log 626 describing the updates; and sending an acknowledgement to the client that sent the write request. MTM 618 may include metadata transaction objects 620 and metadata transaction logic 622 (e.g., an embodiment of logic 63), and may assist in performing the foregoing functions and other functions as well, for example, as described in more detail below in relation to system 700 and methods 800, 900 and 916.

Cache flush logic 612 may be configured to control a flushing of one or more of metadata cache buffers 612 to one or more file systems 624, for example, as described below in relation to system 700 and method 1100. System initialization logic may be configured to initiate one or more of file systems 624, which may include use of file system status parameter 625 for example, as described below in relation to method 1200.

Figure 7:
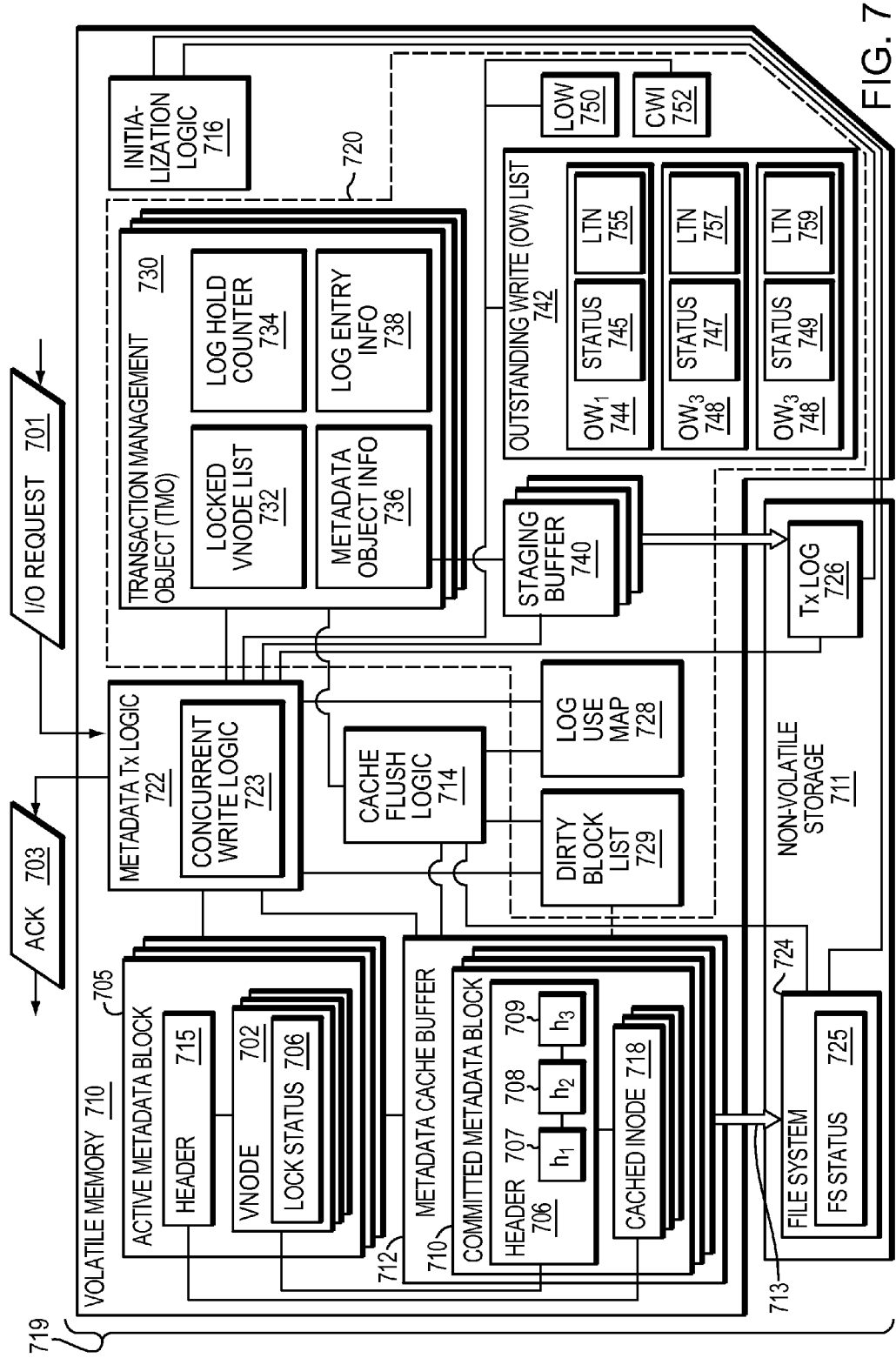
FIG. 7 is a block diagram illustrating an example of system for managing the recording of metadata changes to, and/or the initialization of, a file system, according to some embodiments of the invention.

FIG. 7 is a block diagram illustrating an example of system 700 for managing the recording of metadata changes to, and/or the initialization of, a file system, which may be used in connection with performing one or more aspects of the invention described herein. System 700 is merely an illustrative embodiment of a system for managing the recording of metadata changes to, and/or the initialization of, a file system, and is not intended to limit the scope of the invention. Any of numerous other implementations of such a system, for example, variations of system 700, are possible and are intended to fall within the scope of the invention. System 700 may be an embodiment of system 10, 11 or 12 or 600 described above.

System 700 may include storage system 719, which may be a file-based storage system (e.g., a file server), and which may be an implementation of storage system 609. Storage system 719 may include volatile memory 710 and non-volatile storage 711. Non-volatile storage 711 may include file system 724 and transaction log 727. In some embodiments, file system 724 may implement one or more aspects of any of file systems 32, 33, 34, 62, 70 and or 624 described above, and transaction log 726 may implement one or more aspects of any of transaction logs 60, 35, 36, 37 or 626 described above.

Volatile memory may include any of: one or more active metadata blocks 705; metadata cache buffer 712; cache flush logic 714; system initialization logic 717; one or more metadata transaction objects 720; and metadata transaction logic 722 (which, combined with metadata objects 720 may constitute MTM 720). Each active metadata block 705 may be an in-memory representation of a data block of file system 724, and may include one or more vnodes 702. As used herein, a "vnode" is an in-memory representation of an inode. Each vnode may be considered a kind of working copy of an inode in memory, for which the contents may ultimately be copied to the committed metadata block 710 to be flushed to disk.

Each vnode 702 may include a header 715 and a lock status parameter 706. Lock status parameter 704 may hold a value indicative of whether vnode 702 is currently locked. For example, a vnode may be locked when a write request (e.g., I/O request 701) will result in a change in value of a metadata object included within the vnode. Accordingly, a lock may be placed on the vnode so that no other write requests (or an I/O request that will simply "read" the vnode, but then perform a write operation based on that read—such I/O requests and write requests may collectively be referred to as "intrusive I/O requests" or "intrusive requests") may access the vnode until the metadata transaction resulting in the lock is written to the transaction log 726. Locking vnodes in this manner helps avoid producing an inconsistency in a file system. As is described in more detail below in relation to method 800 of FIG. 8, a vnode lock may be released (e.g., the lock status parameter may be changed to an appropriate value) after the corresponding transaction entry is logged to the transaction log 726 and other processing steps are undertaken.

Metadata cache buffer 712 may include one or more committed metadata blocks 710, each block 710 corresponding to an active metadata block 705. Each committed metadata block 710 may include a header 706, which may include one or more log holds 707, 708 and 709. Each committed metadata block also may include a cached inode 718, each cached inode corresponding to a respective vnode 706, and thus being the cached representation of the same inode of file system 724 represented by respective vnode 706. As is described in more detail below in relation to method 800, a log hold (e.g., 707-709) may be created in a committed metadata block (e.g., 710) after a transaction entry corresponding to a cached inode included in the committed metadata block has been logged to the transaction log 726, and the hold may be released after the committed metadata block has been flushed to disk, for example, as described below in relation to method 1100 of FIG. 11.

In some embodiments of the invention, as described below in relation to methods 800 and 1100, after a transaction affecting an inode has been logged in transaction log 726, the corresponding vnode (previously updated in memory) is now eligible to be flushed to disk during the next cache buffer flush 713. To this end, the contents of vnode 702 may be copied from active metadata block 705 to cached inode 718 of committed metadata block 710, and the contents of committed metadata 718 may be flushed to disk during the next cache buffer flush 713. Thus, it is the contents of metadata cache buffer 712 that are flushed to disk, not the contents of the active metadata block 705. Header 706 may include pointers to both its cached inodes 718 and the respective vnodes 702. As is described below in relation to method 1100, cache flush logic 714 may use DB block list 729 to determine an order in which to flush the contents (i.e. committed metadata blocks 710 (and cached inodes 718 therein) of metadata cache buffer 712 to disk.

Metadata transaction logic 722 may include various logical components including, but not limited to concurrent write logic 723, which may be operative to manage specific aspects of transaction management dealing with making concurrent log writes to the transaction log as described below in relation to methods 800, 900 and 916.

Metadata transaction objects 720 may include any of: one or more transaction management objects (TMOs) 730, dirty block (DB) list 729, log use map 728, one or more staging buffers (staging buffers) 740, outstanding write (OW) list 742, lowest outstanding write (LOW) parameter 750, completed write index (CWI) 752, other elements, or any suitable combination of the foregoing.

A TMO may be created for each write request (e.g., request 701) received by storage system 719; i.e., and be used to help manage the transaction resulting from such write request. As is described below in relation to method 1100, a TMO's lifespan may extend beyond the writing of the transaction of a transaction log, until every cached inode affected by the transaction is flushed to disk as part of one or more cache buffer flushes 713, after which the TMO may be destroyed (i.e., released).

TMO 730 may include any of: locked vnode list 732; log hold counter 734; metadata object info 736; log entry info 738; other elements and any suitable combination of the foregoing. Locked vnode list 732 may include a list of all logging locks that are held by this transaction, and perhaps other information about each of the vnodes. Log hold counter 734 may include a count of the log holds pointing to it—one count for each affected cached inode having a log hold associated with the transaction represented by the TMO. As described below in relation to acts 1114-1118 of method 1100, when the log hold count reaches zero, the TMO may be destroyed. Log entry info 738 may include information about a log entry of transaction log 726 for the transaction (initially reserved and then eventually written to) including, for example, a base location (e.g., address) within transaction log 726 and a size of the transaction. The base location and size of the transaction may be used to clear bits in the log use map 728 when the TMO 730 is destroyed after all affected cached inodes have been flushed to disk.

Metadata object info 736 may include information about metadata objects affected by the transaction, which may be used to help create a transaction entry for the transaction. A transaction entry may first be batched in one of staging buffers 740, from which it then may be written to transaction log 726. As used herein, a "staging buffer entry" is an instance of a transaction entry in a staging buffer (e.g., one of staging buffers 740), and a "log entry" is an instance of a transaction entry in a transaction log (e.g., transaction log 726). Thus, it should be appreciated that, for each write request/transaction, there may be a one-to-one relationship between the following elements: a write request, a TMO, a staging buffer entry and a log entry, and the contents of a log entry and its corresponding staging buffer entry may be the same.

Metadata object info 736 may include any of a plurality of information elements including a list of affected metadata objects, and, for each metadata object in the list, may include any of: an object type (e.g., inode, directory chunk, inode allocation map, block allocation map); a pointer to the metadata object in metadata cache buffer 712; an inode number of the object, an address of the block on disk in the file system that contains the object; an offset to the object within the block; other information about the object; and any suitable combination of the foregoing.

Staging buffers 740 may be used to batch transaction entries (e.g., entry 150 described above in connection with FIG. 4) before writing them to transaction log 726. I/O writes to disk are relatively slow and more computationally expensive (i.e., in terms of resources) compared to writes to volatile memory, and writing each transaction entry to transaction log 726 individually may cause overall performance degradation of system 700. Thus, to improve overall system performance, transaction entries may be batched in staging buffers 740, and then written in batches 741 from staging buffers 740 to transaction log 726. The size and number of staging buffers 740 may be configured to strike a balance between the overall improved system performance and the additional latency for each transaction caused by batching. Further, as described above, transaction log 726 may be divided into segments of configurable size (e.g., 64 KB), which also may be taken into consideration when configuring staging buffer size and numbers. For example, in some embodiments, staging buffers 740 may include 128 staging buffers, and each staging buffer may be 8 KB or 16 KB in size.

Each of staging buffers 740 may be divided into a plurality of sectors, each sector representing the minimum amount of staging buffer space that may be consumed by a transaction entry. Each sector may include contents of only a single transaction at any given time, albeit a transaction may span multiple sectors. That is, is some embodiments, each transaction entry has a size that is a multiple of sector size, and, in the event that the amount of space needed for transaction information/content does not align with sector boundaries (i.e., does not fully consume the entire last sector of the sectors holding the transaction entry), the remaining bits may be padded (e.g., with all "0"s). The sector size may be configured based on several factors, including, for example: staging buffer size; transaction log segment size; transaction log segment size, the typical size and range of sizes of a transaction entry, the frequency of write requests, and the frequency of log writes, and all of these factors themselves may be optimized for overall system performance. In some embodiments, the staging buffer sector size of staging buffers 740 is set to be the same size as the transaction log segments, e.g., 512 bytes.

The number of transaction entries included in each staging buffer 740 and amount of staging buffer space consumed by transaction entries can vary, depending at least in part on: the sector size, the rate of in-coming write requests, the type of metadata affected by such requests, and the timing and frequency of log writes 741 to transaction log 726. The consumed space may range from a configurable minimum (for example, the sector size, e.g., 512 bytes) to the size of the staging buffer (e.g., 8 or 16 KB). The timing and cumulative size of each log write (which may include the contents of a plurality of staging buffers 740) may be configured as described below in relation to method 900 in connection with FIG. 9A. In some embodiments of the invention, the entire contents of a log write must fit within one segment of transaction log 726, in which case a maximum potential size of a log write (if the log write begins at the beginning of the segment) is the segment size (e.g., 64 KB).

OW list 742 may used (e.g., by concurrent write logic 723) to assist in managing concurrent log writes to transaction log 726, for example, as described below in relation to method 916 of FIG. 9B. OW list 742 may include one or more outstanding writes (e.g., OW1 744, OW2 746, and OW3 748), each of which may have a status parameter (e.g., 745, 747 and 749) indicating whether or not its respective OW has been completed, and a lowest transaction number (LTN) parameter (e.g., 755, 757 and 759, respectively). As used herein, an "outstanding log write" or OW is a log write that has been initiated, but for which an acknowledgement (e.g., 703) has not yet been sent in response to the write requests that resulted in the transaction entries included in the log write. Thus, a log write may be completed (i.e., the writing of it to the transaction log on disk has finished), but still outstanding, until acknowledgements have been sent in response to the corresponding write requests.

OW list 742 may be an ordered list, for example a linked list data structure, ordered according to the transaction numbers of the transaction records included within each OW (which may include transaction entries from multiple staging buffers 740), e.g., lowest to highest, in which case the OW that includes the transaction entry having the lowest transaction number may be listed at the beginning (or end) of OW list 742. Alternatively, OW list 742 may not be so ordered, and a lowest outstanding write (LOW) parameter 750 or an index may be provided to record the OW that includes the transaction entry having the lowest transaction number. LOW parameter also may be provided even if OW list 742 is an ordered list. The LTN parameter of each OW entry may be used to determine the order of the OW list; e.g., the chronological order in which the outstanding writes were initiated, and may be used to determine the value of the LOW parameter, for example, as part of act 929. In some embodiments, the LTN value may be any value that is indicative of a position in an order in which it is desired that the outstanding log writes are processed (i.e., post-logging acts 813 are performed thereon). Such a value is not necessarily the lowest transaction number of a given outstanding log write, and may not be a transaction number at all. Accordingly, the LOW parameter may simply indicate a next log write for which post-logging acts 813 are to be performed.

In some embodiments, in addition to, or in lieu of, providing status parameter bits 745, 747 and 749, a completed outstanding write index (CWI) of OWs for which the log writes have been completed may be provided.

Log use map 728 may indicate which of the sectors within transaction log 726 are active, and may include an entry (e.g., a bit) for each sector in transaction log 726. A sector (and the entry stored—at least partially—therein) may be deemed active if it holds a log entry for which the corresponding metadata in the cache buffer has not yet been written in place in the file system. As is described in more detail in relation to act 820 of method 800, the value of an entry corresponding to a transaction log sector may be set to a value indicating "active" when a log entry is created that consumes the sector; and the same entry may be changed (i.e., cleared) to indicate that the sector is free when all corresponding cached inodes have been written in place in the file system, as described below in relation to act 1116 of method 1100.

DB list 729 may include a list of (e.g., pointers to) committed metadata blocks of the file system that include one or more cached inodes affected by a transaction that has been written to the transaction log since a last cache buffer flush. DB list 729 may be modified as described below in relation to method 800 by adding an entry for each committed metadata block affected by a transaction represented by a log entry after the log entry has been written to transaction log 726. A committed metadata block may be so affected if it includes one or more cached inodes affected by the transaction represented by such a log entry. DB list 729 may be used as part of method 1100 to flush dirty blocks (i.e., dirty committed metadata blocks) to disk during a cache buffer flush 713, after which flushed committed metadata blocks may be removed from the DB list.

Aspects of file system 724 may be implemented as described above in relation to FIGS. 1-3 and 6. In some embodiments, file system 724 may include a status parameter 725 (e.g., in its superblock), a value of which may be indicative of whether to replay the transaction log 726 if/when the file system is initialized. That is, parameter 725 may indicate whether the file system 724 is "clean" or "dirty." The file system may be deemed clean if all sectors of the transaction log are clear (e.g., as reflected in log use map 728), i.e., not active; that is, all changes to metadata for which transaction entries have been recorded to transaction log 726 have been written in place in the file system 725. File system is dirty otherwise; i.e., if at least one transaction log sector is active; that is, if at least one metadata change for which transaction entries have been recorded to transaction log 726 have not been written in place in the file system 725.

While during normal file system operation, the clean or dirty state of the file system may be determined by consulting the log use map 728 in volatile memory 710, when the power supplied to the storage system 719 is turned off (i.e., powered down), the log use map is lost, and cannot be used during file system initialization. Accordingly, in some embodiments of the invention, file system status parameter 725 enables the clean or dirty state of file system 724 to be persisted in non-volatile storage and utilized during initialization.

Cache flush logic 714 may be configured to control a flushing of metadata cache buffer 712 to the file system 724 on disk, for example, as described below in relation to method 1100. As describe above, file system 724 may include a status parameter 725 (e.g., in its superblock), a value of which may be indicative of whether to replay the transaction log 726 if/when the file system is initialized. In some embodiments of the invention, flushing the cache may involve setting the status parameter 725 to a value representing that all changes to metadata for which transaction entries have been recorded to transaction log 726 have been written in place in the file system 725.

Initialization logic 716 may control an initialization of file system 709, for example, as described below in relation to FIG. 12. Initialization logic 716 is illustrated as being resident in volatile memory 710, as it may be when it is executed. However, it should be appreciated that, as its purpose is to initialize file system 724 (e.g., when powered up), it also may reside on non-volatile storage 711 and/or be capable of being realized from logic and or data structures resident on non-volatile storage 711.

Figure 8A:
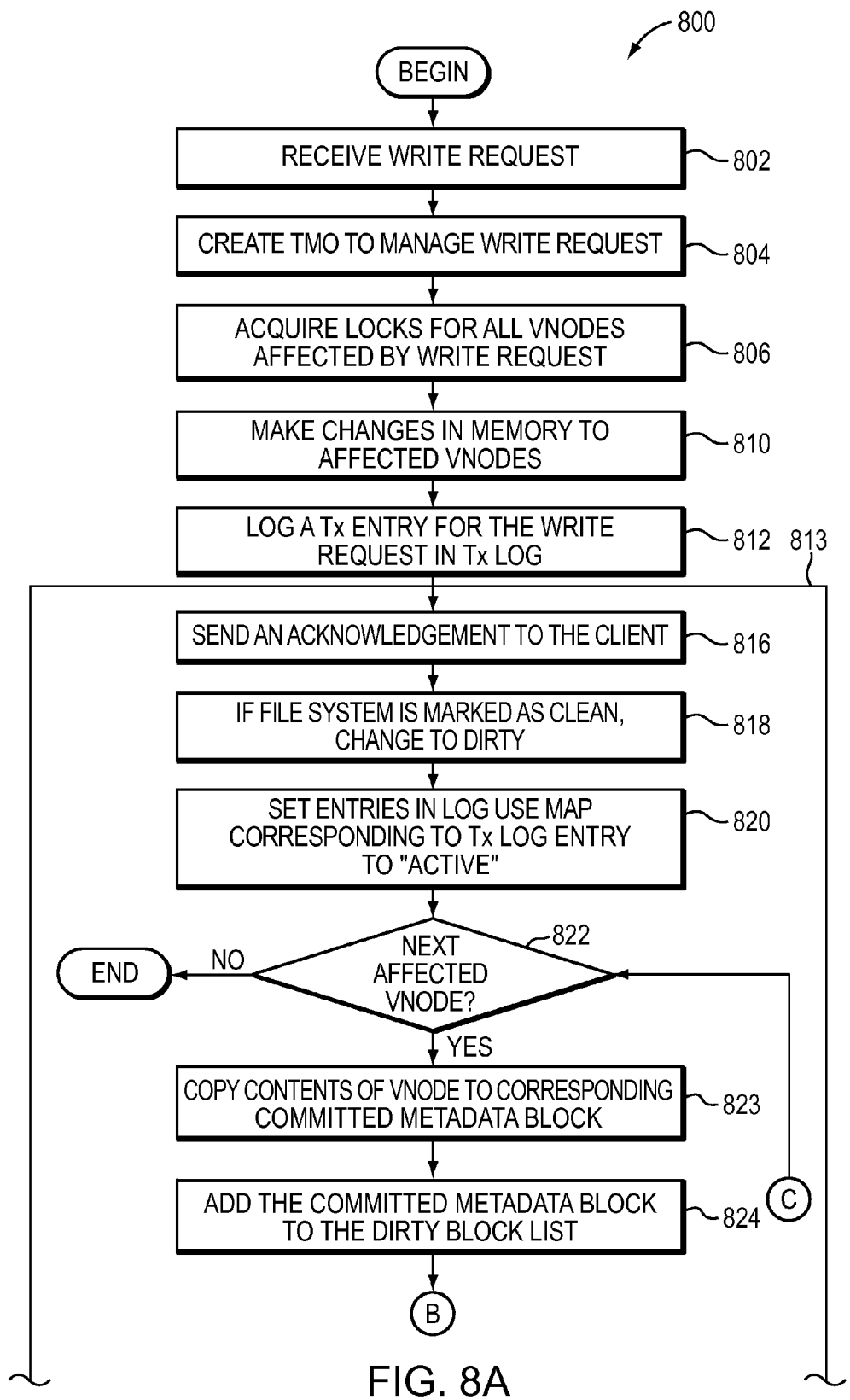
FIGS. 8A and 8B are a flowchart illustrating an example of a method of managing the recording of metadata changes to a file system, according to some embodiments of the invention.
Figure 8B:
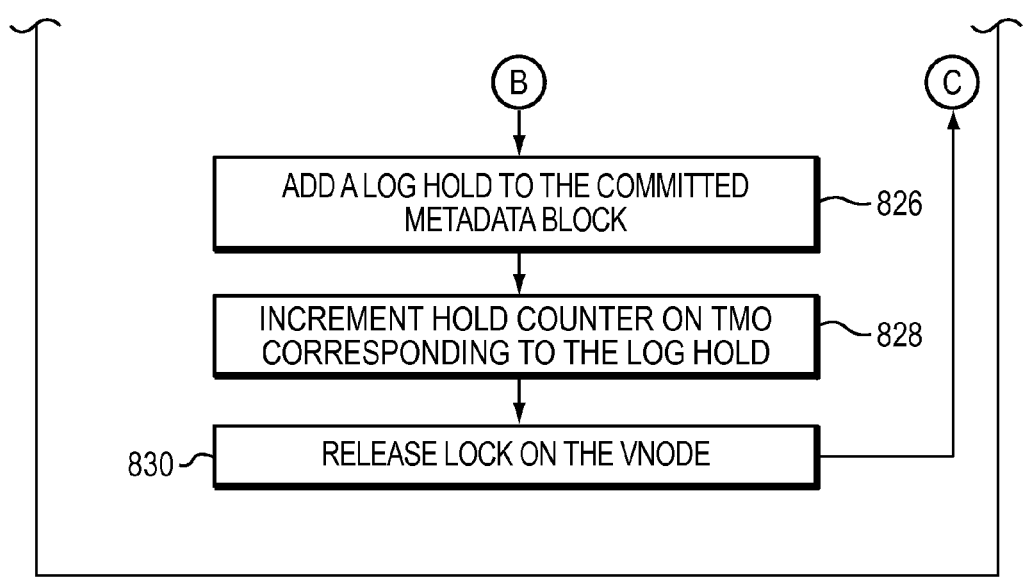

FIG. 8 is a flowchart illustrating an example of a method 800 of managing the recording of metadata changes to a file system (e.g., file system 724) in accordance with some aspects of the invention. Method 800 is merely an illustrative embodiment of a method of managing the recording of metadata changes of a file system, and is not intended to limit the scope of the invention. Any of numerous other implementations of such a method, for example, variations of method 800, are possible and are intended to fall within the scope of the invention. Method 800, and any of the acts thereof and variations thereof, may be implemented using systems 600 and/or 700 or variations thereof. It should be appreciated that, while method 800 illustrates the processing of a single transaction in a more or less linear fashion, transactions may be handled in a batch manner, and one or more acts or operations involving the transaction and/or other transactions may be performed at least partially in parallel and as part of one or more processes and/or process threads, e.g., of system 600 or 700.

In act 802, a write request may be received on a data storage system, e.g., storage system 609 or 709, for example, from any of client 602-606. A TMO (e.g., TMO 730) may be created in act 804, which may be used to manage aspects of the metadata transaction until all metadata changes resulting from the transaction have been written in place in the file system. The TMO may include any of the information described in relation to TMO 730 of system 700.

In act 806, logging locks may be acquired for all vnodes (e.g., any of vnodes 702) affected by the write request. It should be noted that each affected vnode already may be locked in connection with another write request, and thus act 806 may include waiting for such locks to be released before completing act 806. What's more, there may be one or more other write requests already queued ahead of the current write request for one or more locked vnodes, and act 806 may include waiting until the current write request's turn in the queue for each such vnode.

In act 810, the requested metadata changes may be made in memory to the appropriate vnodes (e.g., 702), and, for each vnode, an entry may be added to the list of metadata objects (e.g., as part of info 736) included in the TMO. A log entry for the write request may be logged in a transaction log (e.g., 726) in act 812, an embodiment of which will be described in further detail in relation to methods 900 and 916 of FIGS. 9A and 9B. As described below in relation to method 900, if the transaction log is full, method 900, and in turn method 800, can proceed no further until a cache buffer flush frees up space in the transaction log. After the log entry has been made to the transaction log, post-logging processing 813 may be executed, including, but not necessarily limited to, acts 816-830.

In act 816, an acknowledgment may be sent from the storage system to the client, which reflects that the write request has been executed in the sense that the resulting metadata changes are stable enough to maintain file system consistency—i.e., a corresponding log entry has been made in the transaction log that, in the event of a system crash prior to the metadata changes being made in place in the file system, can be replayed to make the metadata changes in place.

If the file system is currently marked as clean (e.g., the file system status parameter 725 indicates that the file system is clean), then, in act 818, the file system may be changed to be marked as dirty. The file system may be marked as dirty because there is at least one log entry in the transaction log—i.e., the log entry created as part of act 812—for which the corresponding metadata has not yet been written in place in the file system. As is described in more detail below in relation to method 1100 illustrated in FIG. 11, marking the file system as clean will prevent the transaction log from being replayed when the file system is initiated, unless another transaction is subsequently recorded in the transaction log and the corresponding metadata not written from the cache buffer to the file system before the file system is next initiated.

In act 820, in the log use map (e.g., log use map 728), one or more entries (e.g., bits) corresponding to the one or more transaction log sectors consumed by the transaction log entry may be set to active to indicate that not all metadata (e.g., cached inodes) in the cache buffer corresponding to the log entry has been written in place in the file system yet.

There may be multiple vnodes affected by a transaction, and acts 824-830 may be performed for each such vnode. In act 822, it may be determined whether there is any remaining (e.g., a first) vnode affected by the transaction for which acts 824-830 have not yet been executed. If there is no such vnode (i.e., acts 824-830 have already been executed for all the vnodes affected by the transaction), then method 800 may be deemed complete for the given write request.

If is determined in act 822 that there is another vnode, then, in act 824, the contents of the vnode (e.g., 702) may be copied to its respective cached inode (e.g., 718) in act 823, and the committed metadata block (e.g., 710) that includes the cached inode may be added to the DB list (e.g., DB list 729) in act 824 so that the block will be written to disk during the next cache buffer flush.

A log hold may be added to the committed metadata block that includes the cached inode in act 826, and the log hold counter (e.g., log hold counter 734) of the TMO corresponding to the log hold may be incremented in act 828. The log hold and log hold counter may be used to manage the TMO and corresponding transaction entry in the transaction log, as is described below in more detail in relation to method 1100.

In act 830, the lock on the vnode created in act 806 for the transaction may be released, and method 800 may return to act 822. Releasing the lock on the vnode enables a next write request affecting the vnode (e.g., in a queue of requests awaiting access to the vnode) to lock the vnode and be processed.

Method 800 may include additional acts. Further, the order of the acts performed as part of method 800 is not limited to the order illustrated in FIG. 8, as the acts may be performed in other orders and/or one or more of the acts may be performed in parallel, at least partially, e.g., by separate processes and/or threads. For example, acts 804-806 may be performed in any order.

Figure 9A:
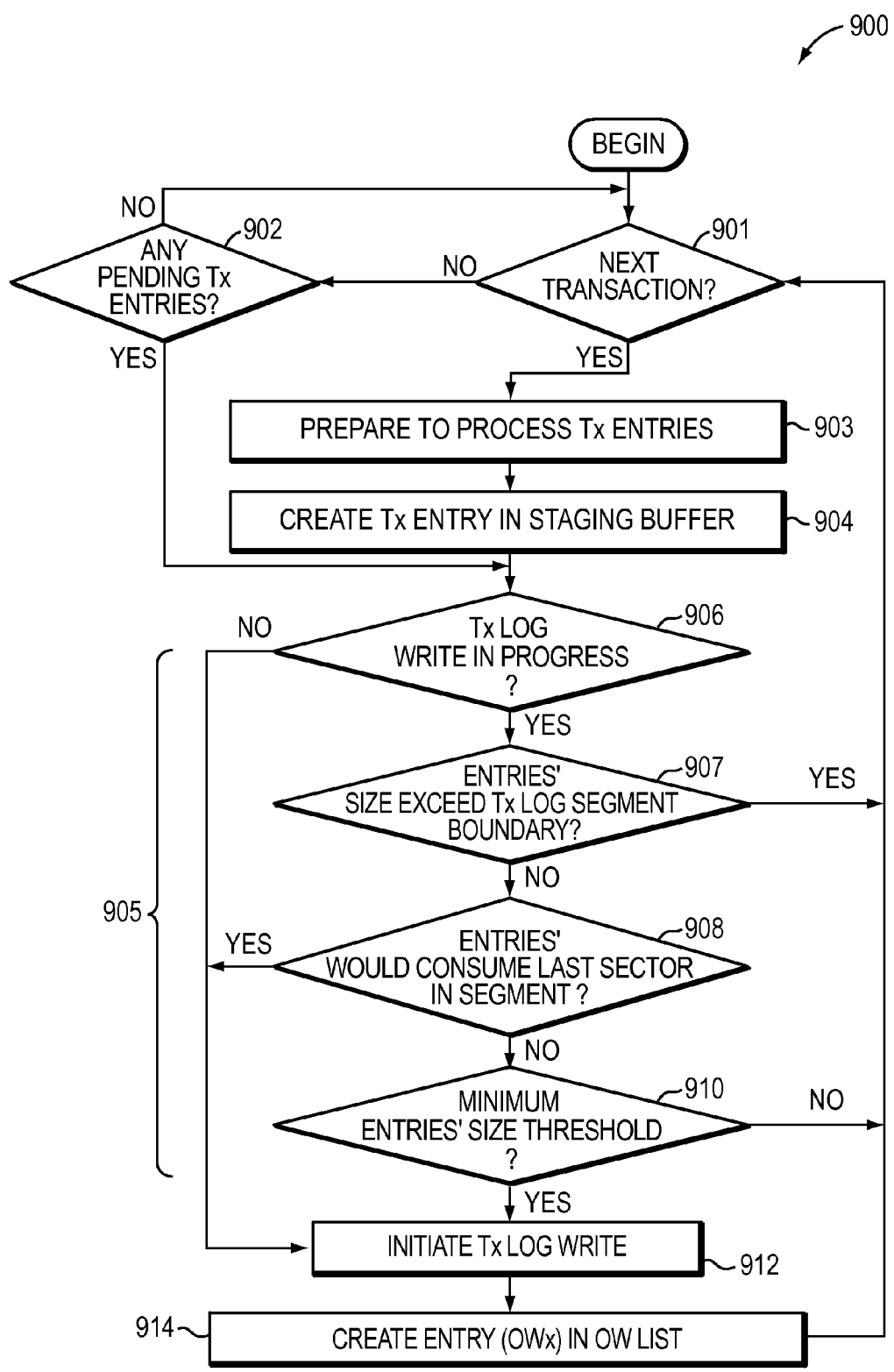
FIGS. 9A and 9B are flowcharts illustrating an example of a technique for managing concurrent write operations to a transaction log, according to some embodiments of the invention.
Figure 9B:
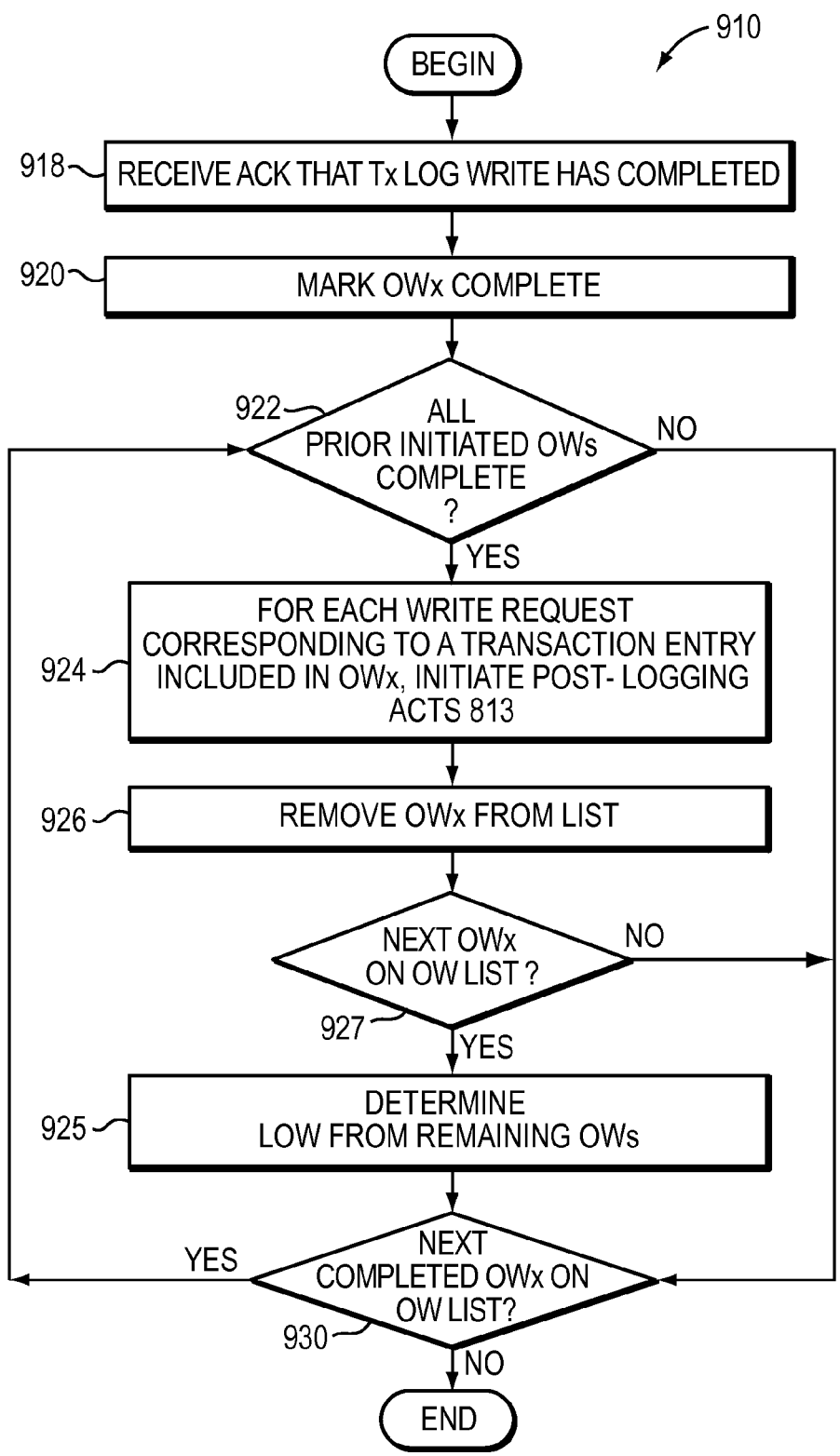

FIGS. 9A and 9B collectively illustrate an example a technique for managing concurrent write operations to a transaction log. This technique is merely an illustrative embodiment of a technique for managing concurrent write operations to a transaction log, and is not intended to limit the scope of the invention. Any of numerous other implementations of such a technique, for example, variations thereof, are possible and are intended to fall within the scope of the invention. This technique and any of the acts thereof, and variations thereof, may be implemented using systems 600 and/or 700 or variations thereof.

FIG. 9A is a flowchart illustrating an example of a method 900 of managing initiating concurrent write operations to a transaction log. Method 900 is merely an illustrative embodiment of a method of managing initiating concurrent write operations to a transaction log, and is not intended to limit the scope of the invention. Any of numerous other implementations of such a method, for example, variations of method 900, are possible and are intended to fall within the scope of the invention. Method 900 and any of the acts thereof, and variations thereof, may be implemented using systems 600 and/or 700 or variations thereof.

In act 901, it may be determined if there is a next transaction ready for processing (i.e., for which acts 804-810 have been performed). If not, then, in act 902, it may be determined whether there are any pending transaction entries in the staging buffers. If it is determined in act 902 that there are no pending transaction entries, then method 900 may return to act 901. Otherwise, method 900 may proceed to act 905 to determine whether to initiate a log write, as described below in more detail. It should be appreciated that acts 901 and 902 may be performed in parallel, at least in part, by a plurality of processes and/or threads.

If it determined in act 901 that there is a next transaction ready for processing, then, in act 903, preparations may be made to process a transaction entry, which may include any of: traversing the list of metadata objects to be logged (i.e., included in the transaction), computing the size of the transaction entry; determining whether there is enough space (e.g., enough available sectors) for the transaction entry in the transaction log; and, if there is enough space, reserving space in the transaction log for the transaction entry. Determining whether there is enough space in the transaction log and reserving space for the transaction entry may involve accessing the log use map (e.g., 728). If it is determined in act 903 that there is not enough space in the transaction log, method 900 cannot proceed further—i.e., no further transactions may be logged, until enough transaction log space is cleared, e.g., by a next cache buffer flush.

In act 904, a next transaction entry may be created in a staging buffer (e.g., one of the plurality of staging buffers 740), for example, by traversing the list of metadata objects to be logged (e.g., again, after having already done so in act 903) and populating the new entry with each metadata object (e.g., inode, directory chunk, allocation bits, etc.).

In act 905, it may be determined whether a log write (i.e., a write I/O operation) to the transaction log (e.g., transaction log 726) should be initiated at this time. If it is determined in act 905 that a next log write should not be initiated, then method 900 may return to act 901. Act 905 may include any of acts 906-910. In act 906, a determination may be made whether a log write is already in progress. If not, then a log write may be initiated in act 912. In some embodiments, act 906 may include determining if there are any currently outstanding writes (e.g., on OW list 742). While not illustrated in FIG. 9, in some embodiments, if it determined that there is no log write in progress, method 900 may determine whether the combined size of the pending entries in the staging buffers (e.g., staging buffers 740) exceeds the available space remaining in the current segment of the transaction log (e.g., transaction log 726). If the combined size does not exceed the available space, then it may be decided that the log write initiated in act 912 be a write operation to the current segment. If the combined size does exceed the available space, it may be decided to make the write operation to a next segment of the transaction log. The decision to write to a next segment may be made because, in some embodiments of the invention, in order to enable the system to properly restore consistency to the file system upon initialization, any log write must be made entirely within one segment of the transaction log.

If it is determined in act 906 that another log write is in progress, then it may be determined in act 907 whether the combined size of the pending entries in the staging buffers exceeds the available space remaining in the current segment of the transaction log. If the combined size of the entries does exceed the available space remaining, then a log write may not be initiated, and method 900 may return to act 901. The decision not to initiate a log write may be made because, in embodiments of the invention, in order to enable the system to properly restore consistency to the file system upon initialization: any log write must be made entirely within one segment of the transaction log; and concurrent log writes must be made within the same segment. In some embodiments of the invention, once it has been determined in act 907 that the pending transaction entries' size exceeds the current segment in 907, a next log write will not be initiated until all outstanding log writes have completed, and the size of this log write may continue to increase by performance of acts 901-904 until this occurs.

If it is determined in act 907 that the combined size of the pending entries does not exceed the available space remaining in the current segment, then, in act 908, it may be determined whether the writing of the pending entries would consume a last sector in the segment (e.g., the last 512 bytes of the segment). That is, in act 908, it may determine whether there would be enough room for another transaction entry (beyond the one currently being considered) in the segment, e.g., as part of a next performance of act 907. If it is determined that the combined size of the pending entries would indeed consume the last sector of the segment, then a log write may be initiated in act 912. Otherwise, it may be determined whether the combined size of the pending entries exceeds a minimum threshold in act 910, and if so, a log write may be initiated in act 912, but otherwise method 900 may return to act 901.

The decision to initiate a log write if the entry would consume the last sector in the segment, even if a minimum size threshold has not been reached, may be to prevent the likely delay in initiating a next log write that would be caused by execution of act 907 in response to the creation of the next transaction entry in 904. That is, if the combined size of the entries in a currently contemplated log write would consume the last sector of the segment, then, after creating another transaction entry, the combined size would exceed the remaining space in the sector. Thus, unless all pending log writes have completed by the time act 907 is performed again, such performance of act 907 will not result in a new log write, and the queue of pending transaction entries will grow, adding to latency of the corresponding write request, and potentially adding latency to future write requests because of locks on vnodes associated with the transaction entries in the staging buffer(s) waiting to be written to the transaction log. While it is possible that all pending log writes will complete before a next transaction buffer entry is created, it is more likely that they will not be completed (at least if there is a relatively active stream of write requests) because writes to memory (including modifying vnodes, creating staging buffer entries and all of the other in-memory updates contemplated by methods 800, 900 and 916) are generally much faster than writes to disk such as a log write. What's more, there may be more than one pending log write, further reducing the likelihood that all log writes would be completed before a next staging buffer entry is created.

In act 914, a new entry (OWx) may be created in the OW list for the log write initiated in act 912, and the entry may include any of: a status parameter (e.g., 745, 747, 749); and a LTN parameter (e.g., 755, 757, 759). In some embodiments in which OW list is an ordered list according to an order in which the outstanding writes are initiated and are to undergo post-logging acts 813, act 914 may include putting the outstanding write at the end of the OW list, in which case an LTN parameter may not be necessary. After performance of act 914, method 900 may return to act 901.

It should be appreciated that, although the process of initiating (acts 912 and 914) and completing (acts 918-930) a given log write are illustrated as being bifurcated between methods 900 and 916 of FIGS. 9A and 9B, respectively, the processing of both initiating and completing a log write may be done by a same process or thread. Methods 900 and 916 are bifurcated in this manner to illustrate an overall chronological perspective of managing concurrent log writes, in which additional transaction entries may be created and log writes initiated between a time at which a log write is initiated and a time at which it is completed. Thus, the return of method 900 to act 901 after performance of act 914 may reflect that, while the process executing the log write of act 912 and 914 awaits acknowledgement from the processor in act 918 of method 916, one or more additional processes or threads may execute acts 901-914 for other transactions and/or log writes.

Method 900 may include additional acts. Further, the order of the acts performed as part of method 900 is not necessarily limited to the order illustrated in FIG. 9A, as the acts may be performed in other orders and/or one or more of the acts may be performed in parallel, at least partially, e.g., by separate processes and/or threads. For example, the order and decision logic of acts 906-910 may be altered to achieve the same overall logical result.

FIG. 9B is a flowchart illustrating an example of a method 916 of managing processing the completion of concurrent write operations to a transaction log. Method 916 is merely an illustrative embodiment of a method of managing processing the completion of concurrent write operations to a transaction log, and is not intended to limit the scope of the invention. Any of numerous other implementations of such a method, for example, variations of method 916, are possible and are intended to fall within the scope of the invention. Method 916 and any of the acts thereof, and variations thereof, may be implemented using systems 600 and/or 700 or variations thereof.

In act 918, an acknowledgment may be received (e.g., from the processor) that an outstanding log write has completed, and the outstanding log write may be marked as complete in act 920. It should be appreciated that between the performance of acts 914 and 918 for the outstanding log write, one or more of acts 912-930 may have been performed for other log writes, for example, by one or more other processes or threads executing concurrently to the process or thread executing acts 912-930 for the current write operation. Further, as noted above, a log write is still "outstanding" even after the log write has completed, and remains outstanding (and on the OW list) until acknowledgments have been initiated to the one or write requests corresponding to log entries included in the log write.

One or more of acts 922-930, which will now be described, may be involved in ensuring that the completion of log writes are acknowledged to clients in the proper order, irrespective of the order in which the log writes were completed. That is, in some embodiments of the invention, to ensure that a file system's consistency is maintained upon file system initialization, metadata transactions must be logged and acknowledged to clients in the same order in which the write requests corresponding to the transactions were received from the clients. Accordingly, as illustrated in methods 800 and 900 and system 1000, staging buffer entries corresponding to write requests may be created in an order in which the write requests were received, and batched into log writes according to this order. However, because of the variability in size of the log writes, and various other factors that may impact the cumulative processing time of each log write, concurrent log writes may complete in an order different than an order in which they were initiated. Accordingly, additional measures (e.g., one or more of acts 922-930) may be undertaken to ensure that acknowledgments are sent to the corresponding clients in the proper order—i.e., in the order in which the corresponding write requests were received by the storage system.

In act 922, it may be determined whether all prior-initiated outstanding log writes on the OW list have completed. For example, this may be determined by determining whether the current log write (OWx) is the outstanding log write that includes the transaction entry having the lowest transaction number of any transaction entry included in any of the concurrent log writes (i.e., OWx=LOW?). As described above, as an alternative to maintaining the LOW parameter, OW list may be an ordered list, for example a linked list data structure, in which the OW that includes the transaction entry having the lowest transaction number is listed at the beginning or end of this list. In such a case, determining whether OWx=LOW may involve determining the OW at the beginning or end of the ordered OW list.

If it is determined in act 922 that less than all prior-initiated OWs have completed, for example, that the current log write does not include the log entry having the lowest transaction number (i.e., OWx≠LOW), then method 916 may end, the result of which is that the current log write will not be further processed until all prior-initiated OWs complete, during which time other transaction entries may be created, and other log writes may be initiated and completed.

If it is determined in act 922 that all prior-initiated OWs have completed, then, in act 924, for each write request corresponding to a transaction entry included in the current log write, post logging acts 813 may be initiated, and the current log write may be removed from the OW list in act 926.

In act 927, it may be determined whether there is a next outstanding log write on the OW list, and, if not, method 900 may end. If it is determined in act 927 that there is a next outstanding write on the OW list, then, in act 929, the outstanding write including the transaction having the lowest transaction number may be determined. If the OW list is an ordered list, act 929 may be simple as setting LOW equal to the first (or last) OW entry on the OW list. In another embodiment, such determination may be made by comparing a lowest transaction number (LTN) of each OW entry on the OW list. It should be appreciated that determining a log write including a transaction having a lowest transaction may be an example of determining a log write that includes a next transaction entry for processing, e.g., in accordance with a FIFO order in which write requests corresponding to the transaction entries are processed.

In act 930, it may be determined whether there is a next completed outstanding write on the OW list. If not, method 900 may end. Otherwise, method 900 may proceed to act 922 and steps 922-930 may be repeated for the next completed outstanding log write. Determining whether there is a next completed outstanding write may include ascertaining a next OW on an ordered OW list for which a completion status bit (e.g., 745, 747 or 749) indicates that the OW is complete. Alternatively, if a completed outstanding write index (e.g., CWI 752) is maintained, the CWI index may be accessed. In such an embodiment, the CWI may render moot the need for a completion status bit for OW entries. If the CWI is ordered according to lowest transaction number, like some embodiments of OW list described above, then CWI alone may be consulted in act 930. If CWI is not so ordered, a combination of the OW list (to determine next in order) and CWI (to determine completed OWs) may be consulted in executing act 930.

Method 916 may include additional acts. Further, the order of the acts performed as part of method 916 is not necessarily limited to the order illustrated in FIG. 9B.

Figure 10:
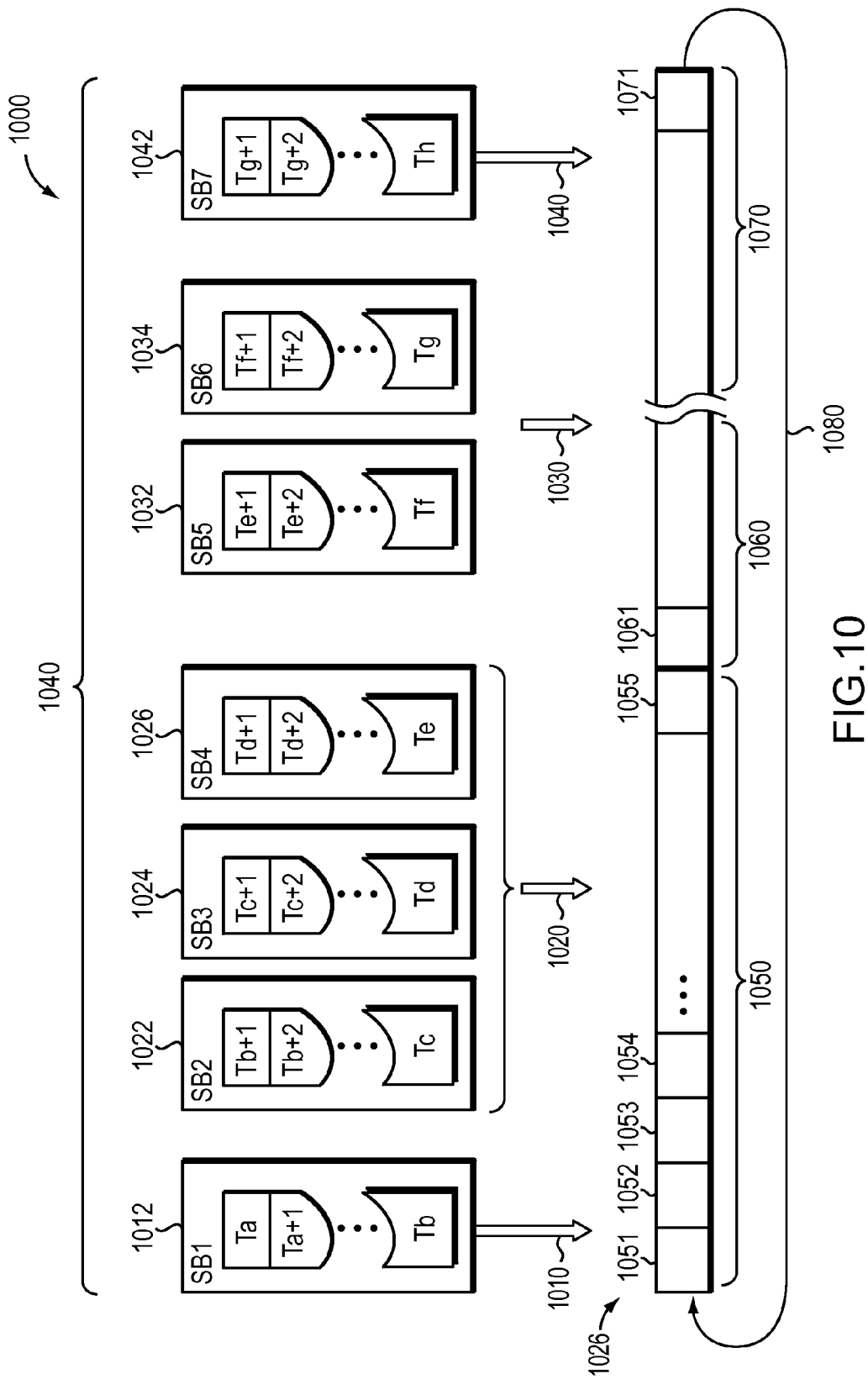
FIG. 10 is a block diagram illustrating an example of a plurality of concurrent writes to a transaction log, according to some embodiments of the invention.

Various aspects of methods 900 and 916 will now be illustrated in relation to FIG. 10. FIG. 10 is a block diagram illustrating an example system 1000 for writing concurrent log writes to a transaction log. System 1000 is merely an illustrative embodiment of a system for writing concurrent log writes to a transaction log, and is not intended to limit the scope of the invention. Any of numerous other implementations of concurrent writes to a transaction log, for example, variations of system 1000, are possible and are intended to fall within the scope of the invention.

System 1000 may include: a plurality of staging buffers 1040, including staging buffers 1012, 1022, 1024, 1026, 1032, 1034 and 1042, each of which may be an embodiment of a staging buffer 740; and transaction log 1026, which may be an embodiment of transaction log 726. Transaction log 1026 may include a plurality of segments, including segments 1050, 1060 (partially shown) and 1070 (partially shown). Each segment may include a plurality of sectors. For example, segment 1050 may include a first sector 1051, a last sector 1055, and several other sectors in-between, including sectors 1052-1054; segment 1060 may include a first sector 1061 and a plurality of other sectors (not shown); and segment 1070 may include a last sector 1070 and a plurality of other sectors (not shown). As illustrated by arrow 1080, transaction log 1026 may be a circular data structure, in that, after a last sector 1071 of the transaction log has been written, a next log write may write over a stale entry in a first sector 1051 of the transaction log.

In the example which will now be described, transaction entries Ta–Tb of staging buffer 1012 may be in the process of being written to segment 1050 as part of log write 1010, which may be the only outstanding log write in an OW list, and thus LOW is equal to log write 1010. In response to creation of transaction entry Te of staging buffer 1026 as part of act 904, it may be determined in act 905 whether to initiate a new log write 1020 that includes pending transaction entries Tb+1–Te of staging buffers 1022-1024. It may be determined that log write 1010 is in progress in act 906, causing method 900 to proceed to act 907. During acts 907 and 908, it may be determined that the combined size of the entries in log write 1020 do not exceed the remaining space in segment 1050 and would not consume the last sector 1055 of segment 1050, causing method 900 to proceed to act 910. In act 910, it may be determined that log write 1020 exceeds a minimum threshold size, and log write 1020 to segment 1050 may be initiated as part of act 912. It should be appreciated that acts 906-910 may have been performed after the creation of each of entries Tb+1–Te–1 in act 904, but that it was not until transaction Te was created that it the combined entry size exceeded the minimum size threshold, as determined in act 910. A new entry may be created in the OW list for log write 1020 in act 914.

Prior to completion of log write 1010 and 1020, entry Tg of staging buffer 1034 may be created in act 904, and it may be determined in act 905 whether to initiate a new log write 1030 that includes pending entries Te+1–Tg of staging buffers 1032 and 1034. It may be determined that log write 1010 is in progress in act 906, causing method 900 to proceed to act 907. It may be determined in act 907 that the combined size of the entries in log write 1030 does not exceed the remaining space in segment 1050. In act 908, however, it may be determined that the combined size of the entries in log write 1030 would consume the last sector 1055 of segment 1050, causing method 900 to proceed to act 912 and initiating log write 1030 to segment 1050. It should be appreciated that acts 906-910 may have been performed after the creation of each of entries Te+1–Tg–1, but for each pass of acts 906-910: a log write was still in progress; and the combined entries' size never exceeded the segment boundary, consumed a last sector of the segment or met the minimum size threshold. In act 914, a new entry may be created in OW list for log write 1030.

Prior to completion of log writes 1010 and 1020, in act 918, an acknowledgement may be received (e.g., from a processor executing the log write) that log write 1030 has completed, and, in act 920, the entry in OW list for log write 1030 may be marked as complete. In act 922, it may be determined that log write 1010 has not completed yet (i.e., 1030#LOW), such that log write 1010 is not processed further.

Prior to the completion of log writes 1010 and 1020, in response to creation of each of entries transaction Te–Th of staging buffer 1042 as part of act 904, it may be determined in act 905 to not initiate a new log write 1040 that includes the pending transaction entries of staging buffers 1042. Specifically, for each new entry, it may be determined that: log write 1010 is in progress (act 906); and the combined size of the pending entries exceeds the remaining space in segment 1050 (act 907), resulting in method 900 returning to act 901. Thus, in some embodiments, log write 1040 will have to wait until all of outstanding log writes 1010, 1020 and 1030 complete, at which time execution of act 905 will result in initiating log write 1040 to segment 1060 in act 912.

After completion of log write 1030, but prior to completion of write 1020, an acknowledgement may be received in act 918 indicating that log write 1010 has completed. In act 920, the entry in OW list for log write 1010 may be marked as complete, and/or if a CWI is being used, and entry may be created therein for the log write. In act 922, as log write 1010 is the lowest outstanding log write (e.g., 1010=LOW), post-logging acts 813 may be initiated for log write 1010 (act 924), and log write 1010 may be removed from the OW list (act 926). In act 927, it may be determined that log writes 1020 and 1030 are still on the OW list, and, in act 929, log write 1020 may be determined to be the lowest remaining outstanding log write. In act 930, it may be determined that log write 1030 has completed, but in act 922, it may be determined that log write 1020 has not completed (1030≠LOW), and no further processing of log writes 1020 or 1030 will occur.

After completion of log writes 1010 and 1030, an acknowledgement may be received in act 918 indicating that log write 1020 has completed. In act 920, the entry in OW list for log write 1020 may be marked as complete, and/or if a CWI is being used, and entry may be created therein for the log write. In act 922, as log write 1020 is the lowest outstanding log write (e.g., 1020=LOW), post-logging acts 813 may be initiated for log write 1020 (act 924), and log write 1020 may be removed from the OW list (act 926). In act 927, it may be determined that log write 1030 is still on the OW list, and, in act 929, log write 1030 may be determined to be the lowest remaining outstanding log write. In act 930, it may be determined that log write 1030 has completed and, in act 922, it may be determine that there are no prior initiated log writes that have not completed (e.g., 1030=LOW), and post-logging acts 813 may be initiated for log write 1030 (act 924). Log write 1030 may be removed from the OW list (act 926), and, in act 927, it may be determined that there are no other outstanding log writes.

Sometime after log write 1030 has been removed from the OW list (act 926), it may be determined in act 906 that there are no outstanding log writes, and write 1040 may be initiated to segment 1060 of transaction log 1026, including consumption of first sector 1061.

Figure 11:
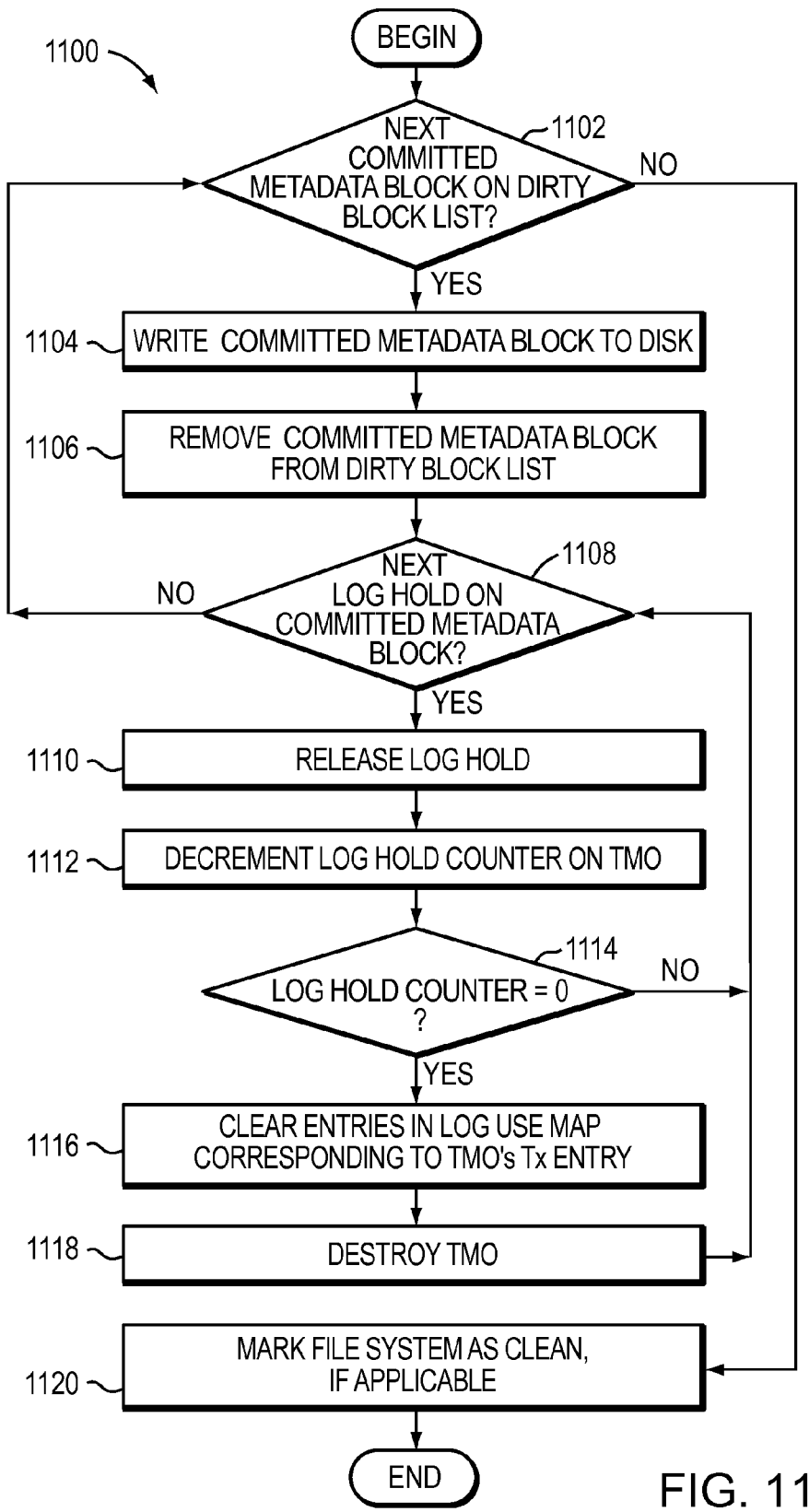
FIG. 11 is a flowchart illustrating an example of a method of flushing cached metadata to disk, according to some embodiments of the invention.

FIG. 11 is a flowchart illustrating an example of a method 1100 of flushing cached metadata (e.g. metadata cache buffer 712) to disk (e.g., file system 724). Method 1100 is merely an illustrative embodiment of a method of flushing cached metadata to disk, and is not intended to limit the scope of the invention. Any of numerous other implementations of such a method, for example, variations of method 1100, are possible and are intended to fall within the scope of the invention. Method 1100 and any of the acts thereof, and variations thereof, may be implemented using systems 600 and/or 700 or variations thereof.

Method 1100 may employ a dirty block list (e.g., DB list 729) to determine committed metadata blocks that should be flushed to disk, e.g., in a FIFO order specified by the DB list, and acts 1104-1120 may be performed for each committed metadata block. In act 1102, it may be determined whether there is a next (e.g., a first) committed metadata block on the dirty block list (e.g., DB list 729). If there is, in act 1104, the next committed metadata block may be written to disk (i.e., in place in the file system).

In act 1106, the committed metadata block written to disk may be removed from the dirty block list, reflecting that the committed metadata block is no longer dirty because, even though there may be a log entry in the transaction log corresponding to the committed metadata block, the contents of the committed metadata block are now consistent with the corresponding block in the file system.

As described above in relation to FIG. 7, there may be multiple holds for a particular committed metadata block (e.g., holds 707, 708 and 709 of committed metadata block 702), each hold corresponding to a particular transaction. Acts 1112-1120 may be performed for each such log hold. In act 1108, it may be determined whether there is a next (e.g., first) log hold within the committed metadata block. If not, method 1100 may return to act 1102 to proceed with execution on a next committed metadata block on the dirty block list. Otherwise, in act 1110, the log hold determined in act 1108 may be released, and the log hold counter on the corresponding TMO may be decremented in act 1112.

In act 1114, it may be determined whether the log hold counter for the current TMO is equal to zero, meaning that there are no more log holds on the TMO and it may be destroyed. If the log hold counter is not equal to zero, then method 1100 may return to act 1108 to proceed with the next log hold for the committed metadata block (if any). Otherwise, the entries (e.g., bits) in the log use map corresponding to the sectors of transaction log consumed by the TMO's log entry may be cleared in act 1116, and the TMO may be destroyed in act 1118; after which method 1100 may return to act 1108 to process the next vnode.

Returning to act 1102, if it is determined that there are no more committed metadata block on the DB list (i.e., there is not a next committed metadata block), then, in act 1120, the file system may be marked as clean if applicable. That is, it may be determined whether, for all transaction log sectors of the transaction log, all metadata changes corresponding to the log entries in the log sectors have been written in place on the file system. For example, it may be determined whether all entries in the log use map (e.g., log use map 728) are marked as clear (i.e., not active) and, if so, the file system may be marked as clean, which may include setting a file system status parameter (e.g., 625, 725) to a particular value.

Method 1100 may include additional acts. Further, the order of the acts performed as part of method 1100 is not limited to the order illustrated in FIG. 11.

In some embodiments of the inventions, marking the file system as clean will prevent the transaction log from being replayed during file system initialization, for example, when the file system is re-initialized after system failure. As a storage system (e.g., 23, 223, 609, 709) may include tens, hundreds or even thousands of file systems, replaying the transaction logs of all the file systems during re-initialization after a failure of the storage system can be relatively time consuming, during which time the storage system or one or more file systems therein is "down" and unusable by clients. By setting a file system parameter to indicate when a file system is clean as described herein, such down time may be reduced if one or more file systems were clean at the time of system failure. This time savings may be significant, which may be especially valuable for critical applications utilizing the storage system.

Figure 12:
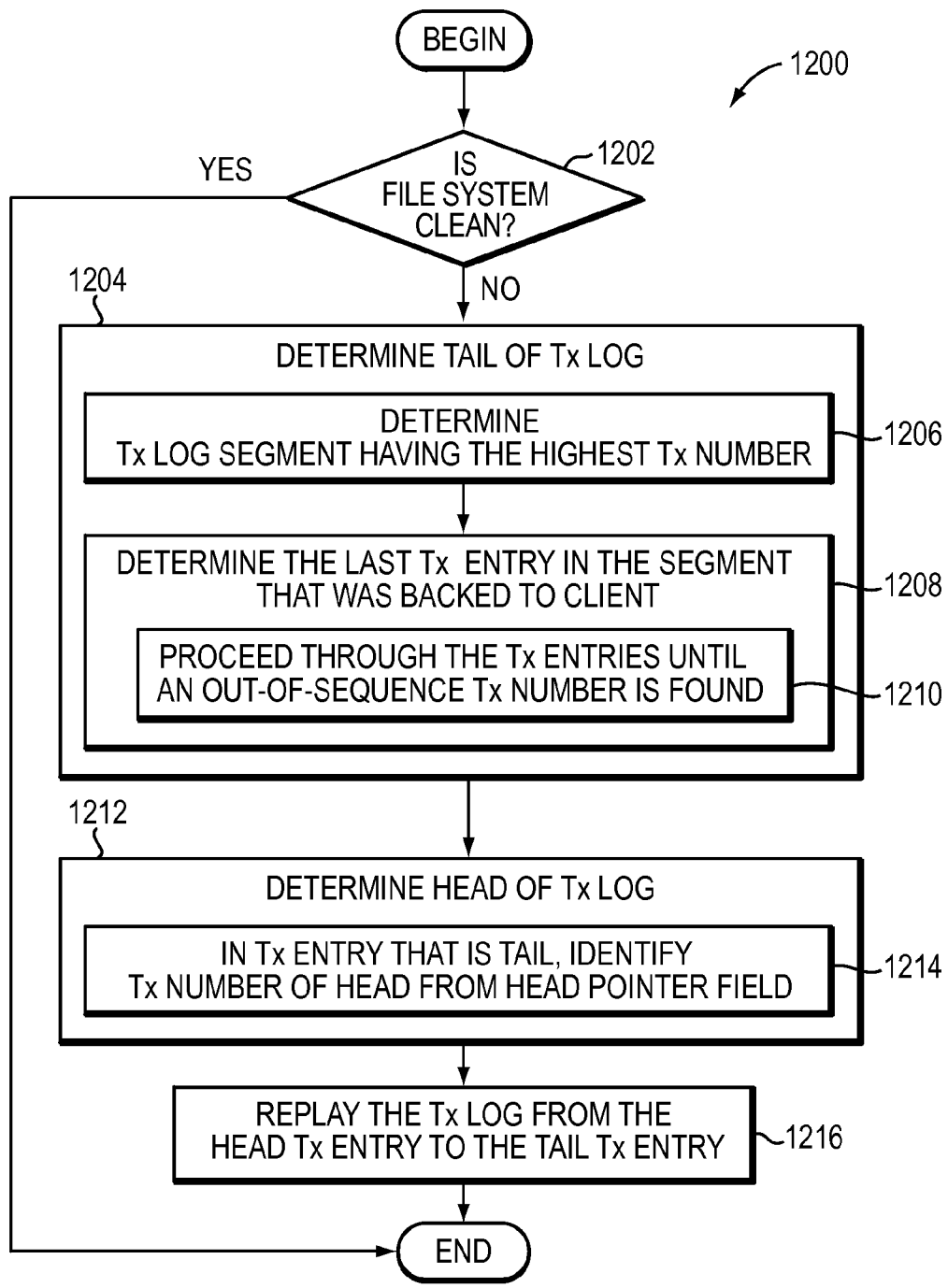
FIG. 12 is a flowchart illustrating an example of initializing a file system, according to some embodiments of the invention.

FIG. 12 is a flowchart illustrating an example of a method 1200 of initializing a file system (e.g., 62, 32, 33, 34, 70, 624, 724). Method 1200 is merely an illustrative embodiment of initializing a file system, and is not intended to limit the scope of the invention. Any of numerous other implementations of such a method, for example, variations of method 1200, are possible and are intended to fall within the scope of the invention. Method 1200 and any of the acts thereof, and variations thereof, may be implemented using system 600 and/or 700 or variations thereof.

Method 1200 may be performed any time a file system in initialized, for example, when a file system (62, 32, 33, 34, 624 or 724) is created and/or a storage system (e.g., 23, 223, 609, 709) is first mounted, or upon a scheduled re-boot (i.e., re-initialization) of a file system or storage system. In such cases, the file system should be marked as clean—i.e., have a status parameter indicating that it is clean—and it should not be necessary to replay the transaction log. However, if a file system is being re-initialized after a system failure (e.g., a crash), then it may be necessary to replay the transaction log, unless the file system is marked as clean. In accordance with some embodiments of the invention, the file system is marked as clean (i.e., may be deemed "consistent" with the transaction log) if, for each entry in the transaction log, all corresponding metadata changes have been made in place in the file system.

In act 1202, it may be determined whether the file system is clean. For example, a file system status parameter (e.g., 725) may be accessed. If it is determined that the file system is clean, then method 1200 may end, as there will be no need to replay the transaction log.

If it is determined that the file system is not clean, then, in act 1204, the tail of the transaction log may be determined. As described above in relation to log entry 150 of FIG. 4, each log entry may have a transaction number (e.g., RN 162) indicative of a position within a chronological order in which log entries are populated. Further, as described above in relation to transaction log 60 of FIG. 5, in some embodiments of the invention, a transaction log (e.g., 60, 626, 726) may be configured such that a first sector of each segment always has a log entry. Thus, determining the tail of the log may include, in act 1206, first determining the segment of the transaction log containing the log entry having the highest transaction number, which may be determined by examining the first sector of the segment, and then, in act 1208, determining the last transaction entry in the segment that was acknowledged to a client.

As described above in relation to method 900 of FIG. 9, even if a log write has been completed, it may not be acknowledged to the client until all earlier-initiated log writes have been completed and acknowledged to the client. Thus, determining a last transaction acknowledged to a client may not be as simple as determining the log entry in the segment having the highest transaction number. Rather, act 1208 may include determining a first out-of-sequence log entry, i.e., a first log entry having a lower transaction number than the immediately preceding log entry. The lower transaction number would indicate that entry is a stale log entry from a previous circling of the transaction log. In such embodiments, the log entry immediately preceding the out-of-sequence entry represents the tail of the log. Thus, act 1208 may include act 1210 of traversing through the transaction entries within the segment until an out-of-sequence transaction number is found.

In act 1212, the head of the log may be determined. As described above in relation to log entry 150 of FIG. 4, each log entry may include a header pointer (e.g., 166) to a head of the transaction log. Thus, in some embodiments, act 1212 may include act 1214 of identifying the transaction number of the log head from a field within the tail log entry identifying the head. In embodiments in which the transaction number of an entry (RN) is assigned such that RN modulo the number of sectors (SN) in the transaction log defines the position (P) of the entry within the log; i.e., the sector in which the entry begins, the position, P(head), of the head within the transaction log may be determined by P(head)=RN(head) modulo SN, where RN(head) is the transaction number of the head specified in the tail entry.

In act 1216, the transaction log then may be replayed from the transaction entry representing the head to the transaction entry representing the tail, resulting in all the metadata changes described therein being made in place in the file system.

As described above in relation to methods 800 and 900, in some embodiments of the invention, a concurrent log write cannot be acknowledged until all earlier-initiated concurrent log writes have completed, and the log use map will not be updated to mark as active the transaction log sectors consumed by the log entries. As a result, during a next cache buffer flush, the file system may be marked as clean even though there are some log entries in the transaction log for which the corresponding metadata changes have not been written in place in the file system. If the file system failed at this time, with the file system marked as clean, these log entries would not be replayed upon re-initialization; i.e., the transaction would be lost. However, this may be the desired result because the client was never made aware through an acknowledgement that the corresponding write request was completed. Accordingly, when the file system is re-initialized, the client would not expect that the metadata changes corresponding to the write request to have been made to the file system. As a result, the storage system and the client would be in synchronization, and the reliability provided by such synchronization generally outweighs losing the record of the transaction (i.e., the log entry).

Method 1200 may include additional acts. Further, the order of the acts performed as part of method 1200 is not limited to the order illustrated in FIG. 12.

Methods 800, 900, 916, 1100 and 1200, and acts thereof, various embodiments and variations of these methods and these acts and other methodologies and techniques described above, individually or in combination, may be defined by computer-readable signals tangibly embodied on one or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other semiconductor memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein (including methods 800, 900, 916, 1100 and 1200 or any acts thereof), and/or various embodiments, variations and combinations thereof. Such instructions may be written in any of a plurality of programming languages or scripts, for example, Java, J#, Visual Basic, C, C#, or C++, Perl, Fortran, Pascal, Eiffel, Basic, COBOL, etc., or any of a variety of combinations thereof. The computer-readable media on which such instructions are embodied may reside on one or more of the components of any of systems 10, 11, 12, 600, 700 and 1000 described herein, may be distributed across one or more of such components, and may be in transition there between.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a system, for example, any of the systems described in relation to FIGS. 1, 2A, 2B, 600, 700 and 1000, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of an ordinal term such as "first", "second", "third", etc., in the claims to modify a claim element does not by itself connote any priority, precedence, or order of one claim element over another or the temporal order in which acts of a method are performed, but are used merely as reference labels to distinguish one claim element (in a same or different claims) having a certain name from another element having a same name (but for use of the ordinal term) to distinguish the claim elements. Use of an ordinal label other than "first" before a claim element does not mean that the invention recited in the claim necessarily includes at least one other element of the same name. For example, recitation of a "second" "item" in a claim does not mean that the invention recited in the claim necessarily includes a first "item." Only recitation of a "first" "item" in the same claim or a claim from which the claim depends would necessarily make such element a part of the recited invention.

What is claimed is:

1. For a file system residing on a non-volatile storage medium having an associated transaction log residing on a non-volatile storage medium, the transaction log including a plurality of log entries, each log entry representing one or more changes to metadata of the file system, the file system including a first data structure including a status parameter, a value of which is indicative of whether to replay the transaction log when the file system is initialized, a method comprising:

determining whether the one or more changes to metadata represented by each of the plurality of log entries have been written in place in the file system; and in response to the determination, setting the status parameter to a value indicative of the determination.

2. The method of claim 1, wherein the act of determining includes determining that the one or more changes to metadata represented by each of the plurality of log entries have been written in place in the file system, wherein the act of setting includes setting the status parameter to a first value indicating to not replay the transaction log when the file system is initialized, and wherein the method further comprises, during an initializing of the file system, refraining from replaying any portion of the metadata transaction log based on the first value.

3. The method of claim 1, further comprising:

logging a first of the plurality of log entries in the transaction log, wherein the act of determining includes determining, based at least in part on the logging, that the one or more changes to metadata represented by each of the plurality of log entries have not been written in place in the file system, and wherein the act of setting includes setting the status parameter to a second value indicating to replay the transaction log when the file system is initialized.

4. The method of claim 3, wherein the transaction log includes a plurality of sectors, wherein the method further comprises providing a log use map including a plurality of map entries, each map entry corresponding to a respective one of the sectors, and each map entry having a value indicative of whether the respective sector has at least a portion of a log entry stored thereon for which the one or more metadata changes represented by the log entry have been written in place in the file system, a first of the plurality of map entries corresponding to a first of the plurality of sectors, the first sector having stored thereon at least a portion of the first log entry, wherein the method further comprises, based at least in part on the logging, setting the first map entry to the second value, and wherein the act of determining includes accessing the log use map.

5. The method of claim 3, further comprising, after performing the acts of logging, determining and setting:

writing the one or more metadata changes corresponding to the first log entry in place in the file system;

based at least in part on the writing, determining that the one or more changes to metadata represented by each of the plurality of log entries have been written in place in the file system; and setting the status parameter to a first value indicating to not replay the transaction log if the file system is initialized.

6. The method of claim 1, further comprising:

writing the one or more metadata changes corresponding to a first of the plurality of log entries in place in the file system, wherein the act of determining includes determining, based at least in part on the writing, that the one or more changes to metadata represented by each of the plurality of log entries have been written in place in the file system, and wherein the act of setting includes setting the status parameter to a first value indicating to not replay the transaction log if the file system is initialized.

7. The method of claim 6, wherein the transaction log includes a plurality of sectors, wherein the method further comprises providing a log use map including a plurality of map entries, each map entry corresponding to a respective one of the sectors, and each map entry having a value indicative of whether the respective sector has at least a portion of a log entry stored thereon for which the one or more metadata changes represented by the log entry have been written in place in the file system, a first of the plurality of map entries corresponding to a first of the plurality of sectors, the first sector having stored thereon at least a portion of the first log entry, wherein the method further comprises, based at least in part on the writing, setting the first map entry to the first value, and wherein the act of determining includes accessing the log use map.

8. The method of claim 1, further comprising:

providing a log use map indicating whether the transaction log includes one or more log entries for which the corresponding one or more metadata changes have not been written in place in the file system, wherein the act of determining includes accessing the log use map.

9. The method of claim 8, wherein the transaction log includes a plurality of sectors, and wherein providing the log use map includes providing a plurality of map entries, each map entry corresponding to a respective one of the sectors, and each map entry having a value indicative of whether the respective sector has at least a portion of a log entry stored thereon for which the one or more metadata changes represented by the log entry have been written in place in the file system.

10. For a file system residing on a non-volatile storage medium having an associated transaction log residing on a non-volatile storage medium, the transaction log including a plurality of log entries, each log entry representing one or more changes to metadata of the file system, the file system including a first data structure including a status parameter, a value of which is indicative of whether to replay the transaction log when the file system is initialized, a system comprising:

first logic to determine whether the one or more changes to metadata represented by each of the plurality of log entries have been written in place in the file system; and second logic to set the status parameter to a value indicative of the determination in response to the determination.

11. The system of claim 10, wherein the first logic includes logic to determine that the one or more changes to metadata represented by each of the plurality of log entries have been written in place in the file system, wherein the second logic includes logic to set the status parameter to a first value indicating to not replay the transaction log when the file system is initialized, and wherein the system further comprises third logic to refrain from replaying any portion of the metadata transaction log based on the first value during an initializing of the file system.

12. The system of claim 10, further comprising:

third logic to log a first of the plurality of log entries in the transaction log, wherein the first logic includes logic to determine that the one or more changes to metadata represented by each of the plurality of log entries have not been written in place in the file system based at least in part on the logging, and wherein the second logic includes setting the status parameter to a second value indicating to replay the transaction log when the file system is initialized.

13. The system of claim 12, wherein the transaction log includes a plurality of sectors, wherein the system further comprises a log use map including a plurality of map entries, each map entry corresponding to a respective one of the sectors, and each map entry having a value indicative of whether the respective sector has at least a portion of a log entry stored thereon for which the one or more metadata changes represented by the log entry have been written in place in the file system, a first of the plurality of map entries corresponding to a first of the plurality of sectors, the first sector having stored thereon at least a portion of the first log entry, wherein the system further comprises fourth logic to set the first map entry to the second value based at least in part on the logging, and wherein the first logic includes logic to access the log use map.

14. The system of claim 12: further comprising:

fifth logic to write the one or more metadata changes corresponding to the first log entry in place in the file system after the performance of the logging, determining and setting, wherein the first logic is operative to determine, based at least in part on the writing, that the one or more changes to metadata represented by each of the plurality of log entries have been written in place in the file system, and wherein the second logic is operative to set, based on such determination, the status parameter to a first value indicating to not replay the transaction log if the file system is initialized.

15. The system of claim 10, further comprising:

third logic to write the one or more metadata changes corresponding to a first of the plurality of log entries in place in the file system, wherein the first logic is operative to determine, based at least in part on the writing, that the one or more changes to metadata represented by each of the plurality of log entries have been written in place in the file system, and wherein the second logic is operative to set the status parameter to a first value indicating to not replay the transaction log if the file system is initialized.

16. The system of claim 15, wherein the transaction log includes a plurality of sectors,
  wherein the system further comprises a log use map including a plurality of map entries, each map entry corresponding to a respective one of the sectors, and each map entry having a value indicative of whether the respective sector has at least a portion of a log entry stored thereon for which the one or more metadata changes represented by the log entry have been written in place in the file system, a first of the plurality of map entries corresponding to a first of the plurality of sectors, the first sector having stored thereon at least a portion of the first log entry,
  wherein the system further comprises fourth logic to set the first map entry to the first value based at least in part on the writing, and
  wherein the first logic is operative to access the log use map.

17. The system of claim 10, further comprising:
  a log use map indicating whether the transaction log includes one or more log entries for which the corresponding one or more metadata changes have not been written in place in the file system,
  wherein the first logic is operative to access the log use map.

18. The system of claim 17, wherein the transaction log includes a plurality of sectors, and
  wherein the log use map includes a plurality of map entries, each map entry corresponding to a respective one of the sectors, and each map entry having a value indicative of whether the respective sector has at least a portion of a log entry stored thereon for which the one or more metadata changes represented by the log entry have been written in place in the file system.

19. A non-transitory computer-readable medium encoded with computer-executable instructions that, as a result of being executed by a computer, control the computer to perform, for a file system residing on a non-volatile storage medium having an associated transaction log residing on a non-volatile storage medium, the transaction log including a plurality of log entries, each log entry representing one or more changes to metadata of the file system, the file system including a first data structure including a status parameter, a value of which is indicative of whether to replay the transaction log when the file system is initialized, a method comprising:
  determining whether the one or more changes to metadata represented by each of the plurality of log entries have been written in place in the file system; and
  in response to the determination, setting the status parameter to a value indicative of the determination.

20. The computer-readable medium of claim 19, wherein the act of determining includes determining that the one or more changes to metadata represented by each of the plurality of log entries have been written in place in the file system,
  wherein the act of setting includes setting the status parameter to a first value indicating to not replay the transaction log when the file system is initialized, and
  wherein the method further comprises, during an initializing of the file system, refraining from replaying any portion of the metadata transaction log based on the first value.

* * * * *